US012800051B2

(12) United States Patent
Arai et al.

(10) Patent No.: US 12,800,051 B2
(45) Date of Patent: Nov. 17, 2026

(54) ELECTRIC VALVE AND METHOD FOR OBTAINING VALVE-MEMBER POSITION OF ELECTRIC VALVE

(71) Applicant: FUJIKOKI CORPORATION, Tokyo (JP)

(72) Inventors: Yusuke Arai, Tokyo (JP); Tatsuya Yoshida, Tokyo (JP); Junya Hayakawa, Tokyo (JP); Takeshi Hosoya, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 212 days.

(21) Appl. No.: 18/844,108

(22) PCT Filed: Mar. 27, 2023

(86) PCT No.: PCT/JP2023/012084

§ 371 (c)(1),
(2) Date: Sep. 5, 2024

(87) PCT Pub. No.: WO2023/203968

PCT Pub. Date: Oct. 26, 2023

(65) Prior Publication Data

US 2025/0198534 A1 Jun. 19, 2025

(30) Foreign Application Priority Data

Apr. 21, 2022 (JP) ................................ 2022-070400

(51) Int. Cl.
*F16K 1/32* (2006.01)
*F16K 31/04* (2006.01)
*H02P 8/22* (2006.01)

(52) U.S. Cl.
CPC ............. *F16K 31/046* (2013.01); *H02P 8/22* (2013.01)

(58) Field of Classification Search
CPC .......... F16K 31/046; F16K 3/085; H02P 8/22; B60H 1/3213
See application file for complete search history.

(56) References Cited

U.S. PATENT DOCUMENTS

| | | | |
|---|---|---|---|
| 10,352,475 | B2 | 7/2019 | Uehara et al. |
| 2006/0261302 | A1 | 11/2006 | Inoue et al. |

(Continued)

FOREIGN PATENT DOCUMENTS

| | | | |
|---|---|---|---|
| EP | 4372258 A1 | 5/2024 | |
| JP | 1995279726 A | 10/1995 | |

(Continued)

OTHER PUBLICATIONS

International Search Report, mailed on Jun. 13, 2023, issued for the International Application No. PCT/JP2023/012084, 5 pages, with English translation.

(Continued)

*Primary Examiner* — Cortez M Cook
(74) *Attorney, Agent, or Firm* — LUCAS & MERCANTI, LLP

(57) ABSTRACT

An electric valve includes a valve member that includes a control portion having a single tapered shape. A stepping motor rotates to move the valve member in a moving section between a valve closing position and a full-open position. When the valve member is at the valve closing position, a control surface of the control portion is in contact with a valve seat. When the valve member moves from the valve closing position and is in the moving section, a throttle passage is formed between the valve seat and the control surface. The moving section includes a first section between the valve closing position and a first position and a second section between the first position and a second position. A controller sets a step angle when the valve member is in the (Continued)

first section to be smaller than when the valve member is in the second section.

3 Claims, 16 Drawing Sheets

(56) References Cited

U.S. PATENT DOCUMENTS

| | | | | |
|---|---|---|---|---|
| 2014/0245778 | A1* | 9/2014 | Suzuki | B60H 1/3213 251/129.11 |
| 2016/0221416 | A1 | 8/2016 | Jiang | |
| 2021/0239231 | A1* | 8/2021 | Muraoka | F16K 1/36 |
| 2022/0113747 | A1 | 4/2022 | Liu et al. | |
| 2024/0353011 | A1* | 10/2024 | Rosenthal | F16K 3/085 |

FOREIGN PATENT DOCUMENTS

| | | | |
|---|---|---|---|
| JP | 1998160034 | A | 6/1998 |
| JP | 1998267153 | A | 10/1998 |
| JP | 2000257740 | A | 9/2000 |
| JP | 2006322535 | A | 11/2006 |
| JP | 2013068294 | A | 4/2013 |
| JP | 2016534304 | A | 11/2016 |
| JP | 2018179133 | A | 11/2018 |
| JP | 2021067344 | A | 4/2021 |
| JP | 2022516592 | A | 3/2022 |
| JP | 2023012951 | A | 1/2023 |
| WO | 2012127860 | A1 | 9/2012 |

OTHER PUBLICATIONS

Written Opinion of the International Searching Authority, mailed on Jun. 13, 2023, issued for the International Application No. PCT/JP2023/012084, 10 pages, with English translation.

International Preliminary Report on Patentability, dated May 2, 2024, issued for the International Application No. PCT/JP2023/012084, 12 pages, with English translation.

Office Action, dated Nov. 12, 2024, issued in connection with the related Japanese Patent Application No. 2022-070400, 11 pages, with English translation.

Office Action dated Oct. 22, 2025, which was issued for the corresponding Korean Patent Application No. 10-2024-7019853, 10 pages, with English translation.

Office Action dated Nov. 4, 2025, which was issued for the corresponding Japanese Patent Application No. 2025-003183, 6 pages, with English translation.

* cited by examiner

FIG.8

310 311 312 313

| SECTION | PULSE NUMBER | NUMBER OF PARTS INTO WHICH STEP ANGLE IS DIVIDED |
|---|---|---|
| FIRST SECTION | 1 | 8 |
| | 2 | 8 |
| | : | : |
| | 599 | 8 |
| | 600 | 8 |
| SECOND SECTION | 601 | 1 |
| | 602 | 1 |
| | : | : |
| | 999 | 1 |
| | 1000 | 1 |

ELECTRIC VALVE AND METHOD FOR OBTAINING VALVE-MEMBER POSITION OF ELECTRIC VALVE

CROSS REFERENCE TO RELATED APPLICATION

This Application is a 371 of PCT/JP2023/012084 filed on Mar. 27, 2023, which, in turn, claimed the priority of Japanese Patent Application No. 2022-070400 filed on Apr. 21, 2022, and both applications are incorporated herein by reference.

TECHNICAL FIELD

The present invention relates to an electric valve and a method for obtaining a valve-member position of the electric valve.

BACKGROUND ART

Patent Literature 1 discloses an example of an electric valve according to the related art. The electric valve is installed in a refrigeration cycle system of an air conditioner. The electric valve includes a valve body, a valve member, and a stepping motor for moving the valve member. The stepping motor includes a rotor and a stator. The rotor rotates in response to pulses input to the stepping motor. The valve member moves along with the rotation of the rotor, and the movement of the valve member changes the flow rate of fluid (refrigerant) flowing through a valve port of the valve body.

CITATION LIST

Patent Literature

Patent Literature 1: Japanese Unexamined Patent Application Publication No. 2018-179133

SUMMARY OF INVENTION

Technical Problem

FIG. 15 illustrates an example of the valve member of the electric valve according to the related art. A valve member 940 illustrated in FIG. 15 includes a control portion 945 and a seating portion 947. The control portion 945 and the seating portion 947 each have a tapered shape. The cone angle of the control portion 945 is smaller than that of the seating portion 947. The upper end of the control portion 945 is connected to the lower end of the seating portion 947. The outer circumferential surface of the control portion 945 serves as a control surface 946 that is a tapered surface. The outer circumferential surface of the seating portion 947 serves as a seating surface 948 that is a tapered surface. A valve body 910 has a valve port 915 and a valve seat 916. The valve seat 916 is an inward tapered surface and encloses the valve port 915. An inner peripheral edge 916*a* of the valve seat 916 is connected to an upper end 915*a* of the valve port 915.

When the seating surface 948 is in contact with the inner peripheral edge 916*a* of the valve seat 916 (i.e., the upper end 915*a* of the valve port 915), the valve port 915 is closed. At this time, the valve member 940 is at a valve closing position. When the seating surface 948 is separated from the valve seat 916, the valve port 915 is open, and a throttle passage is formed between the valve member 940 and the inner peripheral edge 916*a*. Specifically, immediately after the seating surface 948 is separated from the valve seat 916, the throttle passage is formed between the seating surface 948 and the inner peripheral edge 916*a* (a first state). When the seating surface 948 is further separated from the valve seat 916, the throttle passage is formed between the control surface 946 and the inner peripheral edge 916*a* (a second state).

The graph in FIG. 16 schematically illustrates an example of a relationship between the valve opening degree and the area of the throttle passage in the electric valve according to the related art. The valve opening degree indicates a position of the valve member 940 with respect to the valve seat 916 (a moving amount from the valve closing position). The valve opening degree is expressed as a percentage. When the valve member 940 is at the valve closing position, the valve opening degree is 0%, and when the valve member 940 is at a full-open position, the valve opening degree is 100%. The area of the throttle passage is expressed as a percentage. When the valve member 940 is at the valve closing position, the area of the throttle passage is 0%, and when the valve member 940 is at the full-open position, the area of the throttle passage is 100%.

As illustrated in FIG. 16, even though the sizes of the valve port 915, the valve seat 916, and the valve member 940 are within the tolerance, some of the electric valves may have a relationship represented by line A, and others may have a relationship represented by line B. In FIG. 16, a portion of line A corresponding to the first state is denoted by reference sign a1, and another portion corresponding to the second state is denoted by reference sign a2. A portion of line B corresponding to the first state is denoted by reference sign b1, and another portion corresponding to the second state is denoted by reference sign b2. In the section of the valve opening degree corresponding to the first state, the difference in the sizes causes the area of the throttle passage to be much varied. Thus, the presence of the first state causes a large variation in the area of the throttle passage (i.e., the flow rate of fluid) among the electric valves.

For example, an electric valve with a configuration in which a control surface 946 is in contact with a valve seat 916 does not have the first state but only the second state, thereby inhibiting the variation in the area of the throttle passage. However, in order to suppress wear on the valve seat 916, a tapered shape with a relatively large cone angle is required for the control portion 945. Therefore, desired flow-rate characteristics cannot be obtained in the electric valve due to the limitation of the shape of the control portion 945.

Accordingly, it is an object of the present invention to provide an electric valve and a method for obtaining a valve-member position of the electric valve capable of inhibiting a variation in an area of a throttle passage and obtaining a desired flow-rate characteristic.

Solution to Problem

To achieve the object above, an electric valve according to one aspect of the present invention includes a valve body that has a valve port and a valve seat enclosing the valve port, a valve member that faces the valve port, a stepping motor for moving the valve member, and a controller that controls the stepping motor. The valve member includes a control portion that has a single tapered shape. The stepping motor rotates to move the valve member in a moving section between a valve closing position and a full-open position. When the valve member is at the valve closing position, an outer circumferential surface of the control portion is in contact with the valve seat. When the valve member moves from the valve closing position and is in the moving section, a throttle passage is formed between the valve seat and the outer circumferential surface. The moving section includes a first section between the valve closing position and a first position and a second section between the first position and a second position farther from the valve closing position than the first position. The controller sets a step angle for the stepping motor when the valve member is in the first section and another step angle when the valve member is in the second section, and the step angles are different from each other.

In the present invention, preferably, the step angle when the valve member is in the first section is smaller than the step angle when the valve member is in the second section.

In the present invention, preferably, the stepping motor includes a magnet rotor, an A-phase stator, and a B-phase stator. Preferably, when the valve member is in the first section, the controller controls the stepping motor to perform a micro-step operation. Preferably, when the valve member is in the second section, the controller controls the stepping motor to perform a full-step operation.

In the present invention, preferably, the stepping motor includes a magnet rotor, an A-phase stator, and a B-phase stator. Preferably, when the valve member is in the first section, the controller sets an excitation mode of the stepping motor to 1-2-phase excitation. Preferably, when the valve member is in the second section, the controller sets the excitation mode of the stepping motor to 2-phase excitation.

To achieve the object above, a method according to another aspect of the present invention is a method for obtaining a valve-member position of an electric valve. The electric valve includes a valve body that has a valve port and a valve seat enclosing the valve port, a valve member that faces the valve port, a stepping motor for moving the valve member, and a controller that controls the stepping motor. The valve member includes a control portion that has a single tapered shape. The stepping motor rotates to move the valve member in a moving section between a valve closing position and a full-open position. A throttle passage is formed between the valve seat and an outer circumferential surface of the control portion when the valve member moves from the valve closing position and is in the moving section. The method includes a step for obtaining two or more combinations of a position of the valve member and a flow rate of fluid flowing through the valve port when the valve member is at the position, a step for determining a linear function expression representing a relationship between the position and the flow rate based on a flow rate in design when the valve member is at the valve closing position and the combinations, and a step for obtaining a present position of the valve member by using the linear function expression.

Advantageous Effects of Invention

In the electric valve according to the present invention, when the valve member is at the valve closing position, the outer circumferential surface of the control portion having the single tapered shape is in contact with the valve seat. When the valve member moves from the valve closing position and is in the moving section, the throttle passage is formed between the valve seat and the outer circumferential surface of the control portion. Therefore, the variation in the area of the throttle passage can be inhibited. Additionally, the controller sets the step angle for the stepping motor when the valve member is in the first section and the step angle when the valve member is in the second section, and the step angles are different from each other. Therefore, a desired flow-rate characteristic can be obtained by appropriately setting the step angles used in the first section and the second section.

The method for obtaining the valve-member position of the electric valve according to the present invention includes (1) the step for obtaining two or more combinations of the position of the valve member and the flow rate of fluid flowing through the valve port when the valve member is at the position, (2) the step for determining the linear function expression representing the relationship between the position and the flow rate based on the flow rate in design when the valve member is at the valve closing position and the combinations, and (3) the step for obtaining the present position of the valve member by using the linear function expression. Consequently, the present position of the valve member can be obtained on the basis of measured flow rates. Therefore, the electric valve can have a configuration in which a stopper mechanism physically restricting the rotation of the magnet rotor at the valve closing position is omitted.

BRIEF DESCRIPTION OF DRAWINGS

FIG. 8 is a diagram illustrating an example of a table concerning pulse-number information and step-angle information that are stored in a controller of the electric valve.

DESCRIPTION OF EMBODIMENTS

An electric valve 1 according to an embodiment of the present invention is described below with reference to FIGS. 1 to 13. For example, the electric valve 1 is installed in a refrigeration cycle system of an air conditioner and operates in response to a command transmitted from a control unit 400 of the air conditioner. The control unit 400 is an external device that is separated from the electric valve 1.

Figure 1:
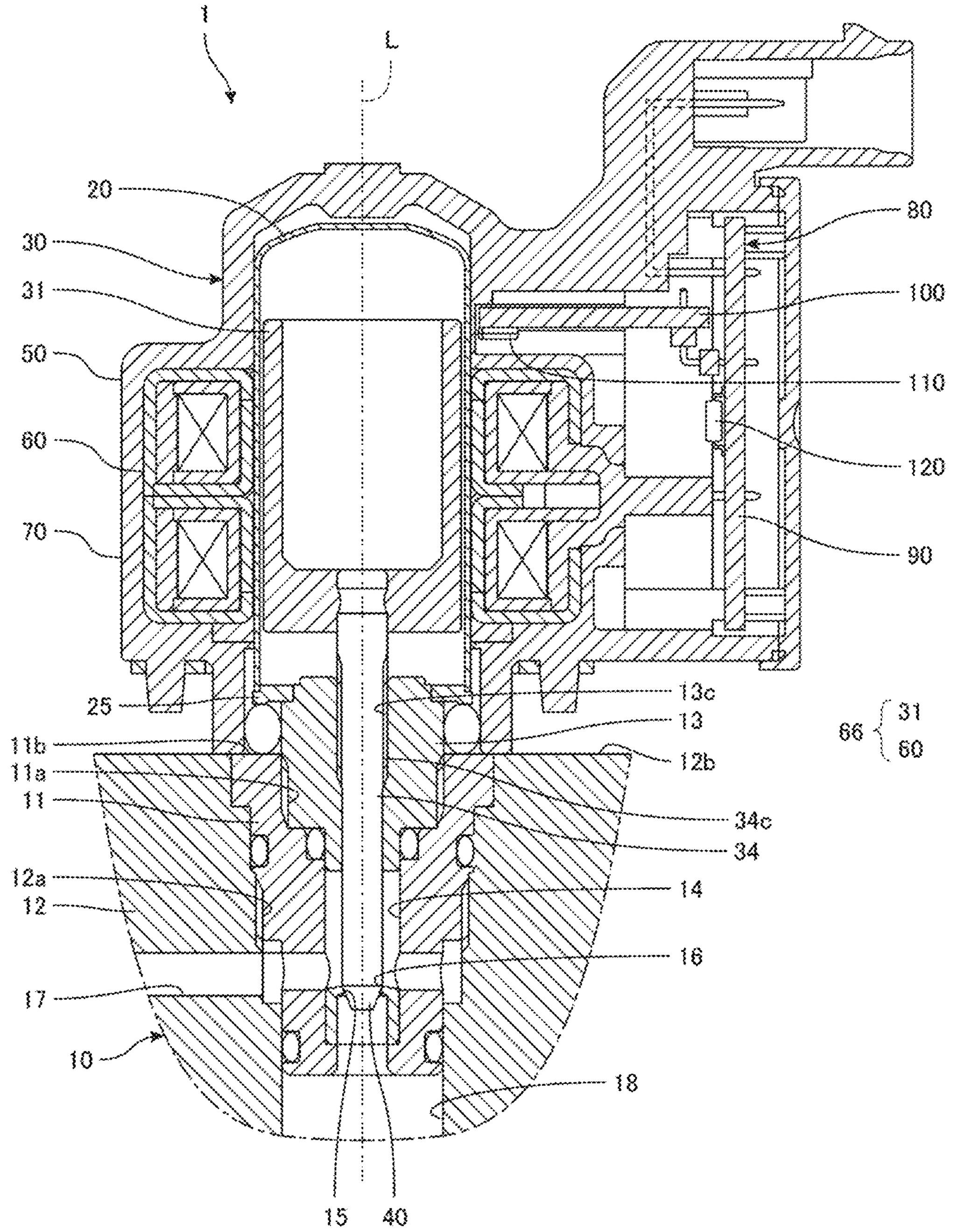
FIG. 1 is a sectional view of an electric valve according to an embodiment of the present invention.
Figure 2:
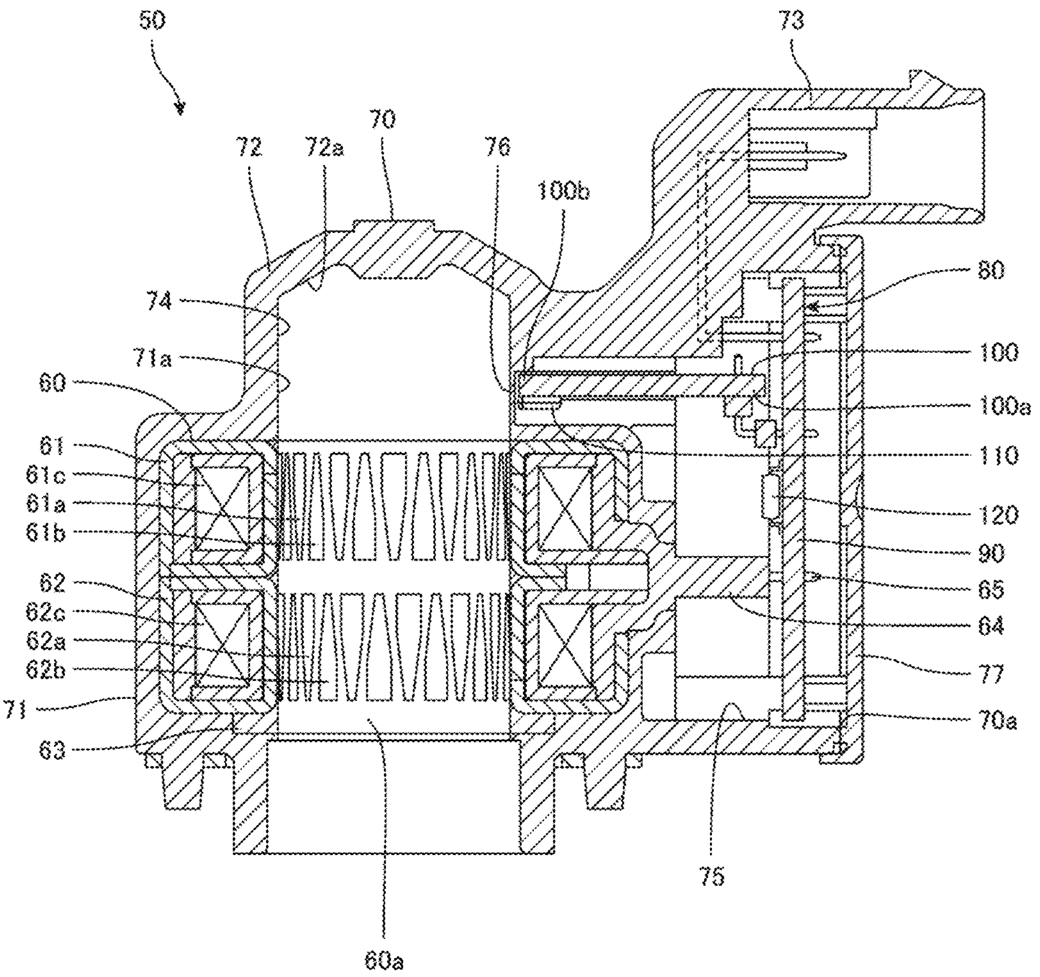
FIG. 2 is a sectional view of a stator unit of the electric valve.
Figure 3:
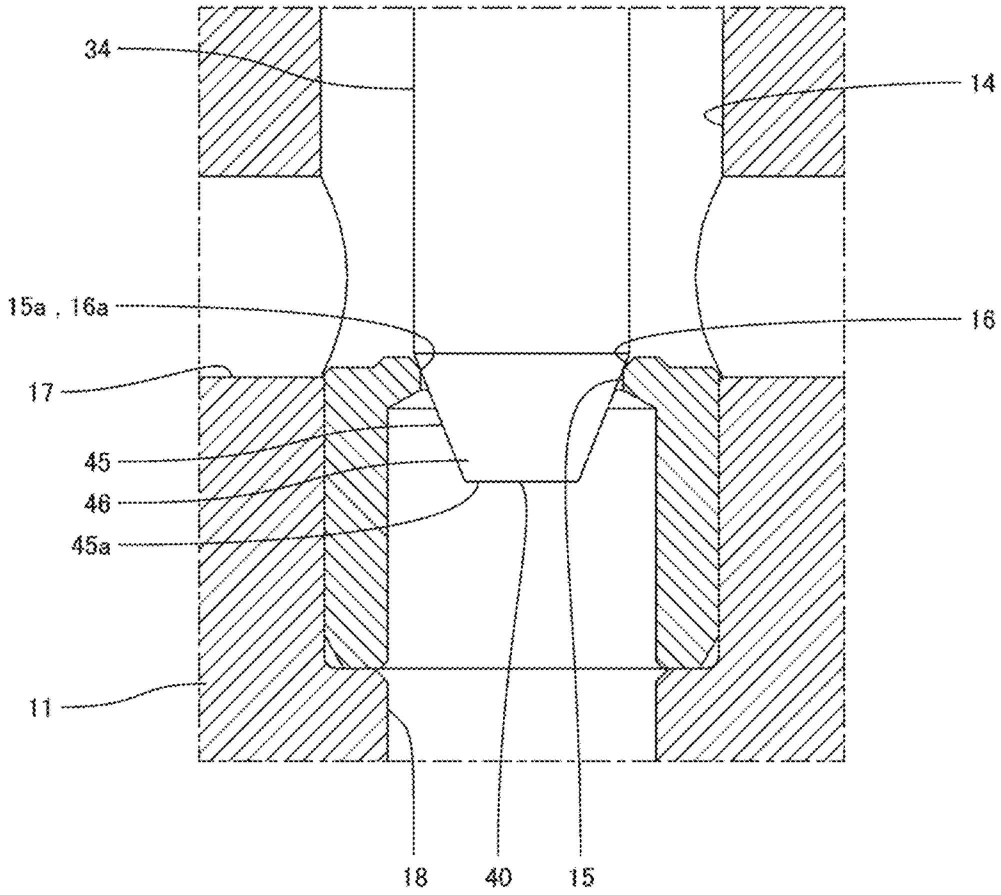
FIG. 3 is a sectional view of a valve member and members in its vicinity of the electric valve when the valve member is at a valve closing position.
Figure 4:
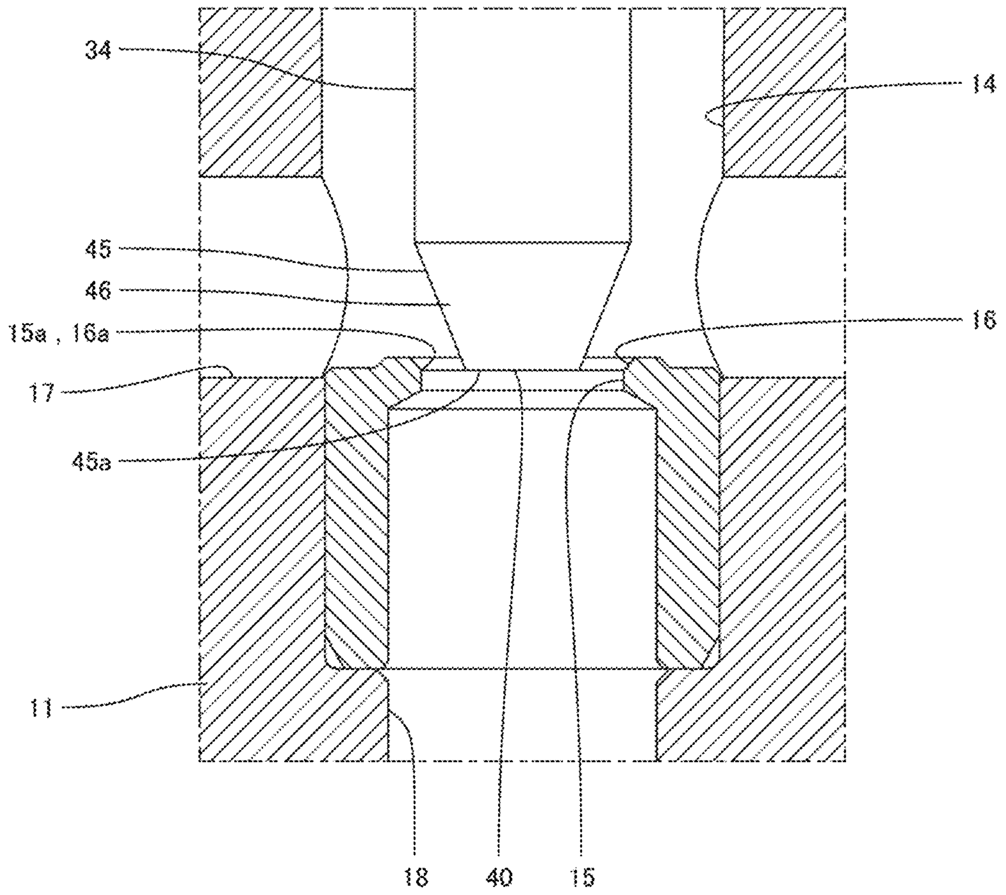
FIG. 4 is a sectional view of the valve member and the members in its vicinity of the electric valve when the valve member is at a full-open position.

FIG. 1 is a sectional view of an electric valve according to the embodiment of the present invention. FIG. 2 is a sectional view of a stator unit of the electric valve. FIGS. 3 and 4 are sectional views of a valve member and members in its vicinity of the electric valve. FIG. 3 illustrates a state in which the valve member is at a valve closing position. FIG. 4 illustrates a state in which the valve member is at a full-open position. In FIGS. 1, 3, and 4, a valve stem and the valve member of the electric valve are illustrated in front view.

As illustrated in FIGS. 1 and 2, the electric valve 1 includes a valve body 10, a can 20, a driving mechanism 30, a valve member 40, and a controller 80.

The valve body 10 is made of a metal, such as an aluminum alloy. The valve body 10 includes a body member 11, a flow channel block 12, and a supporting member 13.

The body member 11 has a circular cylindrical shape. The body member 11 has a valve chamber 14, a valve port 15, and a valve seat 16. The valve port 15 is open to the valve chamber 14. The valve seat 16 is an inward tapered surface with a circular annular shape. The valve seat 16 encloses the valve port 15 in the valve chamber 14. An inner peripheral edge 16*a* of the valve seat 16 is connected to an upper end 15*a* of the valve port 15. The body member 11 has a first mounting hole 11*a*. The first mounting hole 11*a* is provided in an upper surface 11*b* of the body member 11.

The flow channel block 12 has a rectangular parallelepiped shape. The flow channel block 12 has a second mounting hole 12*a*. The second mounting hole 12*a* is provided in an upper surface 12*b* of the flow channel block 12. The body member 11 is disposed in the second mounting hole 12*a*. The body member 11 is mounted in the flow channel block 12 by a screw structure. The upper surface 11*b* of the body member 11 is flush with the upper surface 12*b* of the flow channel block 12. Flow channels 17 and 18 are provided in the body member 11 and the flow channel block 12. The flow channel 17 is connected to the valve chamber 14. The flow channel 18 is connected to the valve chamber 14 through the valve port 15. In the electric valve 1, the flow channel block 12 can be omitted, and the body member 11 may have a rectangular parallelepiped shape.

The supporting member 13 has a circular cylindrical shape. The supporting member 13 is disposed in the first mounting hole 11*a*. The supporting member 13 is mounted in the body member 11 by a screw structure. The upper part of the supporting member 13 projects upward from the upper surface 11*b* of the body member 11. The supporting member 13 has an internal thread 13*c*. The internal thread 13*c* is disposed on the inner circumferential surface of the supporting member 13.

The can 20 is made of a metal, such as stainless steel. The can 20 has a circular cylindrical shape. The can 20 is open at the lower end and is closed at the upper end. The lower end of the can 20 is secured to the upper part of the supporting member 13 via a connecting member 25 having a circular annular plate-like shape.

The driving mechanism 30 moves the valve member 40 in an up-and-down direction (a direction of an axis L). The driving mechanism 30 includes a magnet rotor 31, a valve stem 34, and a stator unit 50.

The magnet rotor 31 has a circular cylindrical shape. The magnet rotor 31 is open at the upper end and is closed at the lower end. The outer diameter of the magnet rotor 31 is smaller than the inner diameter of the can 20. The magnet rotor 31 has a plurality of north (N) poles and a plurality of south(S) poles. The N poles and the S poles are disposed on the outer circumferential surface of the magnet rotor 31. The N poles and the S poles each extend in the up-and-down direction. The N poles and the S poles are alternately arranged at regular angular intervals in the circumferential direction. The magnet rotor 31 has, for example, twelve N poles and twelve S poles.

The valve stem 34 has a circular columnar shape. The upper end of the valve stem 34 is coaxially secured to the lower end of the magnet rotor 31. The valve stem 34 has an external thread 34*c*. The external thread 34*c* is disposed on the outer circumferential surface of the valve stem 34. The valve stem 34 is disposed in the supporting member 13, and the external thread 34*c* is screwed into the internal thread 13*c*.

The valve member 40 is disposed in the valve chamber 14. The valve member 40 faces the valve port 15 in the up-and-down direction. The valve member 40 is connected to the lower end of the valve stem 34. For example, the valve stem 34 and the valve member 40 are integrally formed by cutting a workpiece with a circular columnar shape.

The valve member 40 includes a control portion 45. The control portion 45 has a single tapered shape (a truncated conical shape) with a diameter gradually decreasing toward the valve port 15. In other words, the control portion 45 does not have a shape that includes multiple tapered shapes with different cone angles. The cone angle of the control portion 45 is set to an angle capable of suppressing wear on the valve seat 16. The cone angle of the control portion 45 is preferably set to 30 to 60 degrees. The outer circumferential surface of the control portion 45 serves as a control surface 46. The control surface 46 is an outward tapered surface.

The valve member 40 is moved in the up-and-down direction by the driving mechanism 30. The movement of the valve member 40 opens and closes the valve port 15. Specifically, the valve member 40 moves between a valve closing position Pa illustrated in FIG. 3 and a full-open position Pz illustrated in FIG. 4. A section between the valve closing position Pa and the full-open position Pz serves as a moving section of the valve member 40. At the valve closing position Pa, the control surface 46 is in contact with the inner peripheral edge 16*a* of the valve seat 16. At the full-open position Pz, the position of a lower end 45*a* of the control portion 45 in the up-and-down direction coincides with the position of the inner peripheral edge 16*a* in the up-and-down direction. When the valve member 40 moves from the valve closing position Pa and is in the moving section, a circular annular gap (a throttle passage) is formed between the inner peripheral edge 16*a* and the control surface 46. The area of the throttle passage is closely related to the flow rate of fluid flowing through the valve port 15.

Figure 5:
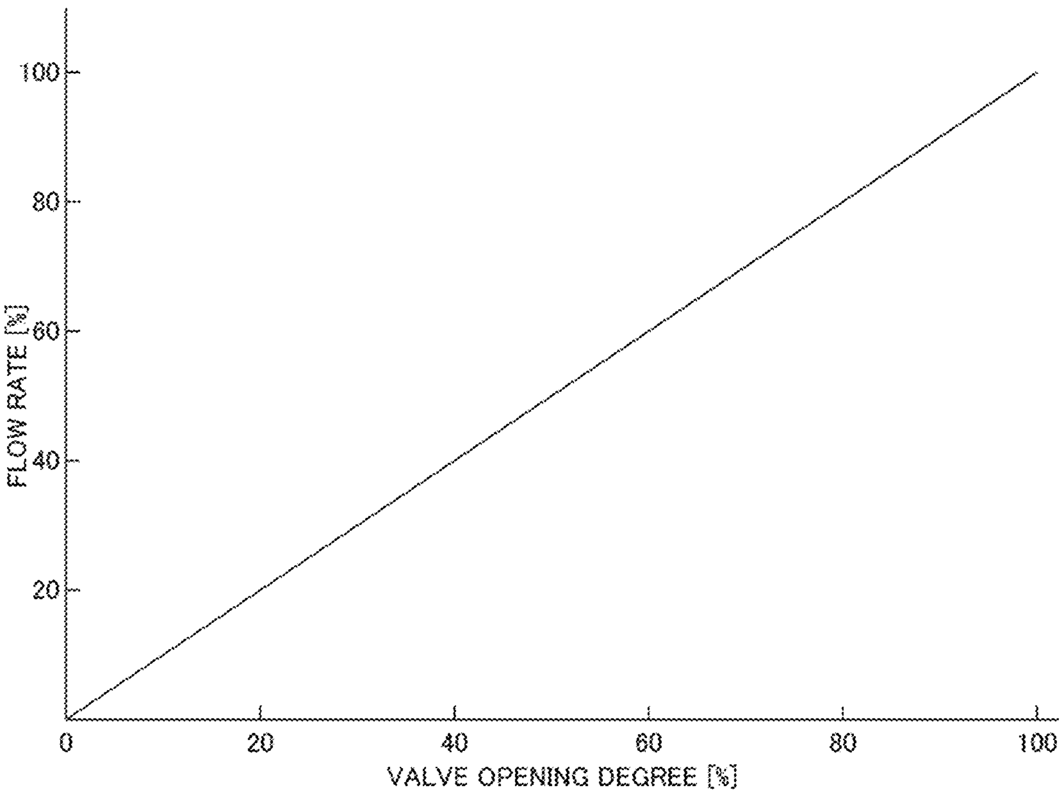
FIG. 5 is a graph showing a relationship between a valve opening degree and a flow rate in the electric valve.

The graph in FIG. 5 shows the relationship between a valve opening degree and a flow rate in the electric valve 1. The valve opening degree indicates a position of the valve member 40 with respect to the valve seat 16 (a moving amount from the valve closing position Pa) and is expressed as a percentage. When the valve member 40 is at the valve closing position Pa, the valve opening degree is 0%. When the valve member 40 is at the full-open position Pz, the valve opening degree is 100%. The flow rate indicates the flow rate of fluid flowing through the valve port 15 and is expressed as a percentage. When the valve member 40 is at the valve closing position Pa, the flow rate is 0%. When the valve member 40 is at the full-open position Pz, the flow rate is 100%. A shown in FIG. 5, the electric valve 1 (the valve member 40) has a basic flow-rate characteristic with the flow rate changing linearly according to the valve opening degree. The position of the valve member 40 corresponds to the position of the magnet rotor 31.

The internal thread 13*c* of the supporting member 13 and the external thread 34*c* of the valve stem 34 constitute a screw-feed mechanism. When the magnet rotor 31 is rotated in a valve opening direction, a screw-feed action between the internal thread 13*c* and the external thread 34*c* moves the valve stem 34 and the valve member 40 upward. When the magnet rotor 31 is rotated in a valve closing direction, the screw-feed action between the internal thread 13*c* and the external thread 34*c* moves the valve stem 34 and the valve member 40 downward. When the valve member 40 moves downward and the control surface 46 comes into contact with the inner peripheral edge 16*a* of the valve seat 16, the valve seat 16 restricts the valve member 40 from moving downward. The external thread 34*c* is firmly screwed into the internal thread 13*c*, stopping the screw-feed mechanism. Therefore, the rotation of the valve stem 34 and the magnet rotor 31 in the valve closing direction is restricted.

The stator unit 50 includes a stator 60 and a housing 70.

The stator 60 has a circular cylindrical shape. The stator 60 includes an A-phase stator 61, a B-phase stator 62, and a molded element 63 made of synthetic resin.

The A-phase stator 61 includes a plurality of claw-pole type pole teeth 61*a* and 61*b* in the inner circumference. The tip ends of the pole teeth 61*a* point down, and the tip ends of the pole teeth 61*b* point up. The pole teeth 61*a* and the pole teeth 61*b* are alternately arranged at regular angular intervals in the circumferential direction. The A-phase stator 61 has, for example, twelve pole teeth 61*a* and twelve pole teeth 61*b*. The angle between the pole tooth 61*a* and the pole tooth 61*b* adjacent to each other is 15 degrees. When a coil 61*c* of the A-phase stator 61 is energized, the pole teeth 61*a* and the pole teeth 61*b* have opposite polarities.

The B-phase stator 62 includes a plurality of claw-pole type pole teeth 62*a* and 62*b* in the inner circumference. The tip ends of the pole teeth 62*a* point down, and the tip ends of the pole teeth 62*b* point up. The pole teeth 62*a* and the pole teeth 62*b* are alternately arranged at regular angular intervals in the circumferential direction. The B-phase stator 62 has, for example, twelve pole teeth 62*a* and twelve pole teeth 62*b*. The angle between the pole tooth 62*a* and the pole tooth 62*b* adjacent to each other is 15 degrees. When a coil 62*c* of the B-phase stator 62 is energized, the pole teeth 62*a* and the pole teeth 62*b* have opposite polarities.

The A-phase stator 61 is disposed coaxially with the B-phase stator 62. The A-phase stator 61 is in contact with the B-phase stator 62. When viewed in the direction of the axis L, the angle between the pole tooth 61*a* of the A-phase stator 61 and the pole tooth 62*a* of the B-phase stator 62 adjacent to each other is 7.5 degrees.

The molded element 63 fills the A-phase stator 61 and the B-phase stator 62. The molded element 63 forms a stator inner-circumferential surface 60*a* together with the pole teeth 61*a* and 61*b* and the pole teeth 62*a* and 62*b*. The diameter of the stator inner-circumferential surface 60*a* is equal to that of the outer circumferential surface of the can 20. The molded element 63 includes a terminal supporting portion 64.

The terminal supporting portion 64 extends in a lateral direction (a direction perpendicular to the axis L) from the A-phase stator 61 and the B-phase stator 62. The terminal supporting portion 64 supports terminals 65. The terminals 65 extend in the lateral direction from the tip end of the terminal supporting portion 64. The terminals 65 are connected to the coil 61*c* of the A-phase stator 61 and the coil 62*c* of the B-phase stator 62.

In the electric valve 1, the respective central axes of the body member 11 (the valve port 15 and the valve seat 16), the supporting member 13, the can 20, the magnet rotor 31, the valve stem 34, the valve member 40 (the control portion 45), and the stator 60 (the A-phase stator 61 and the B-phase stator 62) are aligned with the axis L.

The can 20 is disposed inside the stator 60. The magnet rotor 31 is disposed inside the can 20. The magnet rotor 31 and the stator 60 are members of a stepping motor 66.

Figure 6A:
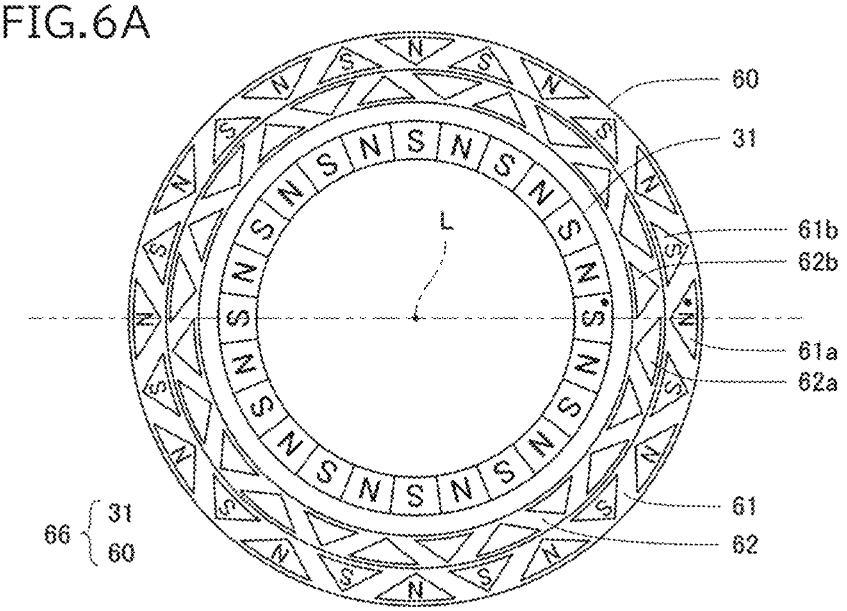
FIGS. 6A and 6B show a diagram illustrating a positional relationship between a magnet rotor and a stator of the electric valve.
Figure 6B:
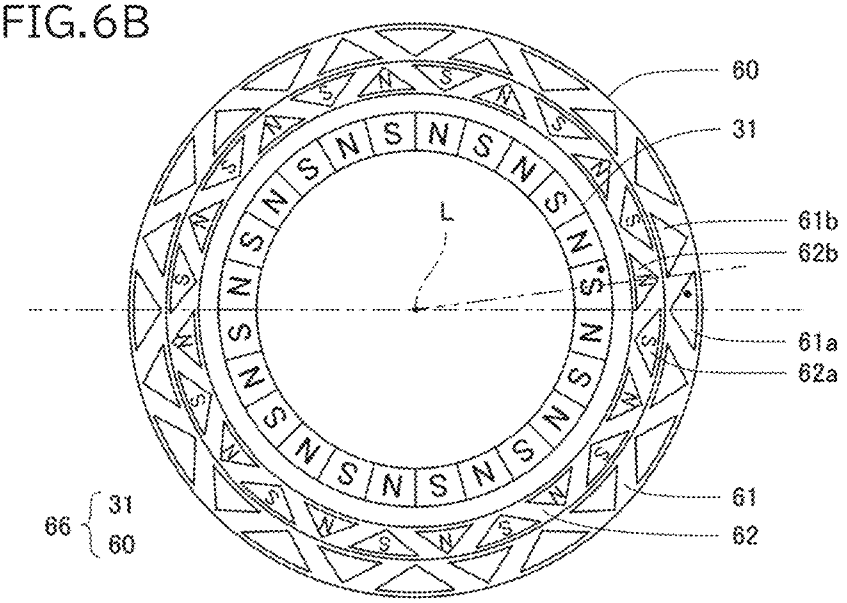

The stepping motor 66 is capable of performing a full-step operation and a micro-step operation. FIGS. 6A and 6B illustrate positional relationships between the magnet rotor 31 and the stator 60. FIG. 6A shows a state in which magnetic poles (the N and S poles) of the magnet rotor 31 radially face the pole teeth 61*a* and 61*b* of the A-phase stator 61. FIG. 6B shows a state in which the magnetic poles of the magnet rotor 31 radially face the pole teeth 62*a* and 62*b* of the B-phase stator 62. In FIGS. 6A and 6B, the magnetic pole as a reference is marked with a black dot, and the pole tooth as a reference is marked with a black dot.

The full-step operation involves rotating the magnet rotor 31 in response to a single pulse input to the stepping motor 66 from a position (the position illustrated in FIG. 6A) where the magnetic poles face the pole teeth 61*a* and 61*b* to a position (the position illustrated in FIG. 6B) where the magnetic poles face the pole teeth 62*a* and 62*b*, which are adjacent to the pole teeth 61*a* and 61*b*, or rotating the magnet rotor 31 in response to a single pulse input to the stepping motor 66 from the position illustrated in FIG. 6B to the position illustrated in FIG. 6A. In the embodiment, the rotation angle (a step angle) per pulse used in the full-step operation is 7.5 degrees.

The micro-step operation involves rotating the magnet rotor 31 in response to a single pulse input to the stepping motor 66 by an angle obtained by equally dividing the step angle used in the full-step operation. The micro-step operation is performed by finely controlling the values of the driving currents supplied to the coil 61*c* of the A-phase stator 61 and the coil 62*c* of the B-phase stator 62. For example, the step angle used in the micro-step operation is 0.9375 degrees (dividing the angle into eight parts), 1.875 degrees (dividing the angle into four parts), or 1.5 degrees (dividing the angle into five parts). In the embodiment, the micro-step operation further involves rotating the magnet rotor 31 in response to a single pulse being input by an angle (3.75 degrees) that is half of the step angle used in the full-step operation. This operation is also referred to as "a half-step operation".

In the embodiment, when the stepping motor 66 performs a full-step operation of 500 pulses, the magnet rotor 31 rotates by 3750 degrees, moving the valve member 40 from the valve closing position Pa to the full-open position Pz. In this specification, "inputting pulses to the stepping motor 66" is synonymous with "supplying driving currents corresponding to the pulses to the stator 60 of the stepping motor 66".

The housing 70 is made of synthetic resin. The housing 70 houses the stator 60 and the controller 80. The housing 70 includes a peripheral wall portion 71, an upper wall portion 72, and a connector 73.

The peripheral wall portion 71 has a circular cylindrical shape. The stator 60 is embedded in the peripheral wall portion 71. The diameter of an inner circumferential surface 71*a* of the peripheral wall portion 71 is equal to that of the stator inner-circumferential surface 60*a*. The inner circumferential surface 71*a* is flush and continuous with the stator inner-circumferential surface 60*a*. The upper wall portion 72 has a dome shape. The upper wall portion 72 is connected to the upper end of the peripheral wall portion 71. The connector 73 is disposed on the upper part of the housing 70. The inner circumferential surface 71*a* of the peripheral wall portion 71, an inner surface 72*a* of the upper wall portion 72, and the stator inner-circumferential surface 60*a* define an inner space 74 of the stator unit 50. The can 20 is disposed in the inner space 74.

The housing 70 has a circuit board space 75. The circuit board space 75 is next to the inner space 74. A partition wall 76 is disposed between the inner space 74 and the circuit board space 75. The partition wall 76 separates the inner space 74 from the circuit board space 75. The housing 70 has an opening 70*a* that communicates with the circuit board space 75, and the opening 70*a* is closed by a lid member 77.

The controller 80 is disposed in the circuit board space 75 of the housing 70. The controller 80 includes a main circuit board 90, a sub circuit board 100, a magnetic sensor 110, and a microcomputer 120.

The main circuit board 90 is a printed circuit board on which electronic components are mounted. The main circuit board 90 is housed in the circuit board space 75. The main circuit board 90 is disposed parallel to the up-and-down direction. The microcomputer 120 is mounted on the main circuit board 90. The terminals 65 of the stator 60 are connected to the main circuit board 90.

The sub circuit board 100 is a printed circuit board on which electronic components are mounted. The sub circuit board 100 is housed in the circuit board space 75. The sub circuit board 100 is arranged perpendicular to the main circuit board 90. A first end 100*a* of the sub circuit board 100 is disposed near the main circuit board 90. A second end 100*b* of the sub circuit board 100 is disposed near the partition wall 76. The sub circuit board 100 is connected to the main circuit board 90 via a board-to-board connector.

The magnetic sensor 110 is, for example, a Hall IC. The magnetic sensor 110 is disposed at the second end 100*b* of the sub circuit board 100. The magnetic sensor 110 and the magnet rotor 31 are laterally arranged with the can 20 and the partition wall 76 in between. The magnetic sensor 110 outputs a signal corresponding to the direction of the magnetic field generated by the magnet rotor 31.

For example, the microcomputer 120 is a microcomputer for embedded devices in which a central processing unit, a non-volatile memory, a working memory, a communication module, a motor driver, and so on are integrated into one package. The microcomputer 120 controls the electric valve 1. The non-volatile memory, the working memory, the communication module, and the motor driver may be separate electronic components that are externally connected to the microcomputer 120.

Figure 7:
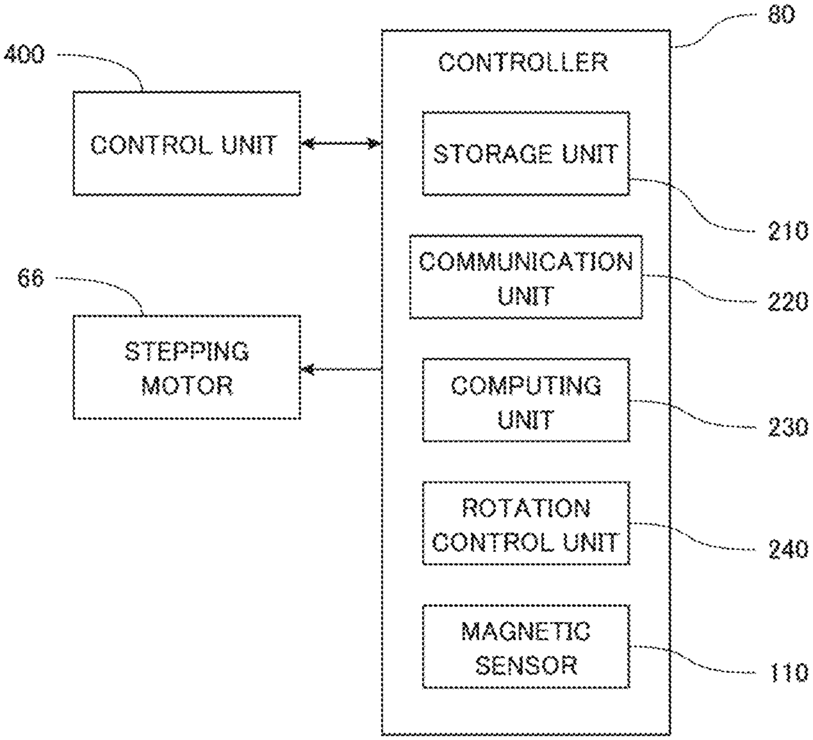
FIG. 7 is a functional block diagram of the electric valve.

FIG. 7 illustrates a functional block diagram of the electric valve 1. As illustrated in FIG. 7, the controller 80 includes a storage unit 210, a communication unit 220, a computing unit 230, and a rotation control unit 240. The non-volatile memory serves as the storage unit 210. The central processing unit executes a program stored in the non-volatile memory and functions as the communication unit 220, the computing unit 230, and the rotation control unit 240. The working memory stores variables used by the computing unit 230 and the rotation control unit 240. The communication module is connected to the control unit 400 of the air conditioner via a cable, which is not illustrated, attached to the connector 73. The motor driver is connected to the stepping motor 66. Specifically, the motor driver is connected to the coil 61*c* of the A-phase stator 61 and the coil 62*c* of the B-phase stator 62. The motor driver supplies the driving currents corresponding to the pulses to the coil 61*c* and the coil 62*c*.

For example, the storage unit 210 stores a table 310 illustrated in FIG. 8. The table 310 includes a section information area 311, a pulse-number information area 312, and a step-angle information area 313.

In the section information area 311, items of information relating to sections set between the valve closing position Pa and the full-open position Pz of the valve member 40 are set. In the section information area 311, "a first section" and "a second section" are set as the items of the information relating to the sections.

In the pulse-number information area 312, items of information (pulse-number information) relating to pulse numbers assigned in ascending order to intervals between the valve closing position Pa and the full-open position Pz of the valve member 40 are set. In the pulse-number information area 312, pulse numbers "1" to "1000" are set as the items of the pulse-number information. The pulse numbers "1" to "600" are assigned to "the first section" of the section information area 311, and the pulse numbers "601" to "1000" are assigned to "the second section" of the section information area 311.

Figure 9:
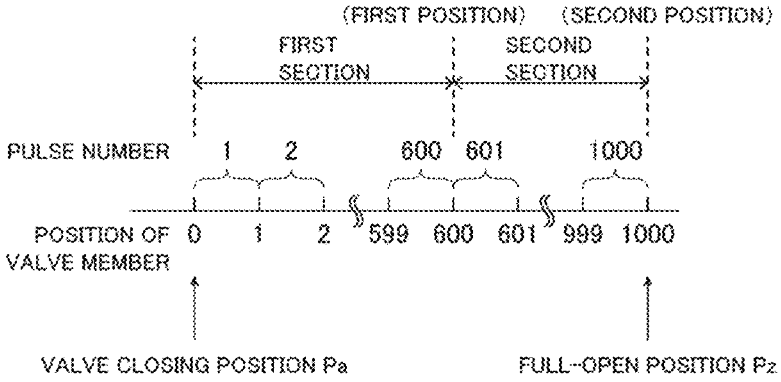
FIG. 9 is a diagram illustrating a relationship between pulse numbers assigned to intervals between the valve closing position and the full-open position and positions of the valve member.

FIG. 9 illustrates a relationship between pulse numbers assigned to the intervals between the valve closing position Pa and the full-open position Pz and positions of the valve member 40. In the moving section, positions "0" to "1000" of the valve member 40 are set in ascending order from the valve closing position Pa to the full-open position Pz. The pulse numbers "1" to "1000" are assigned to the intervals between the positions "0" to "1000". The pulse number "1" is assigned to the interval between the positions "0" and "1", the pulse number "2" is assigned to the interval between the positions "1" and "2", and so on. For example, when the valve member 40 is at the position "1", the item of the information relating to the pulse number "1" is used in order to move the valve member 40 to the position "0", or the item of the information relating to the pulse number "2" is used in order to move the valve member 40 to the position "2". In the embodiment, the position "0" serves as the valve closing position Pa, the position "600" serves as a first position, and the position "1000" serves as a second position and the full-open position Pz. The second position is farther from the valve closing position Pa than the first position.

In the step-angle information area 313, items of information (step-angle information) relating to step angles each of which corresponds to one of the pulse numbers set in the pulse-number information area 312 are set. In the step-angle information area 313, the numbers of parts into which the step angle used in the full-step operation is divided are set as the items of the step-angle information. In the step-angle information area 313, "8" is set in correspondence with the pulse numbers "1" to "600", and "1" is set in correspondence with the pulse numbers "601" to "1000". In other words, 7.5 degrees/8=0.9375 degrees is set as the step angle used in "the first section", and 7.5 degrees/1=7.5 degrees is set as the step angle used in "the second section". The step angle of the stepping motor 66 used in the first section is different from the step angle used in the second section. The step angle of the stepping motor 66 used in the first section is smaller than the step angle used in the second section. Numerical values each indicating a step angle may be set as the items of the step-angle information.

Although the storage unit 210 stores the pulse-number information and the step-angle information in a table format, the storage unit 210 may store them in another format such as a mathematical expression.

Figure 10:
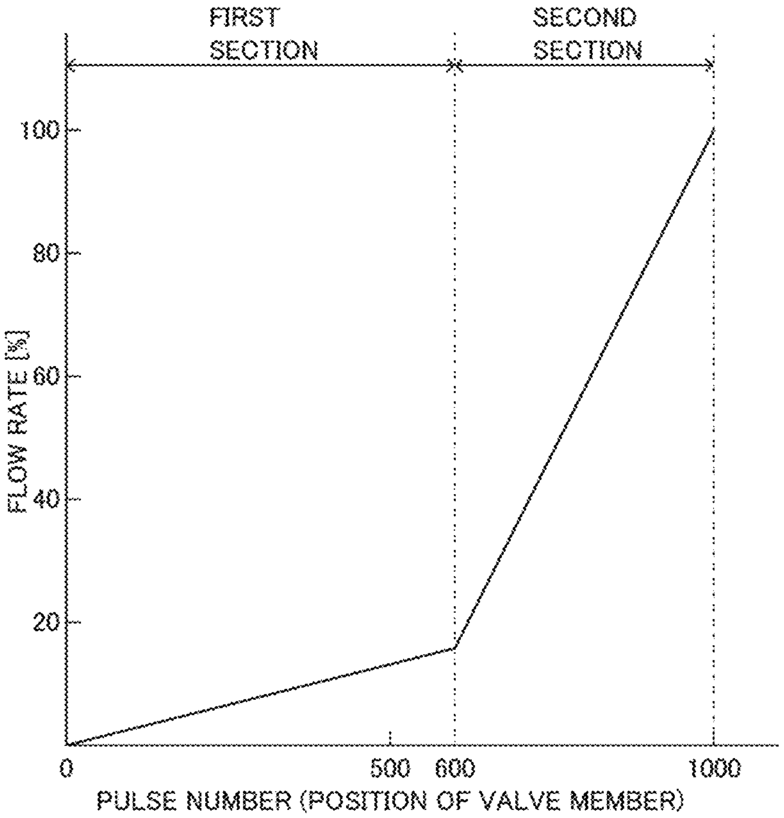
FIG. 10 is a graph showing an example of a relationship between the position of the valve member and the flow rate of fluid flowing through a valve port of the electric valve.
Figure 11:
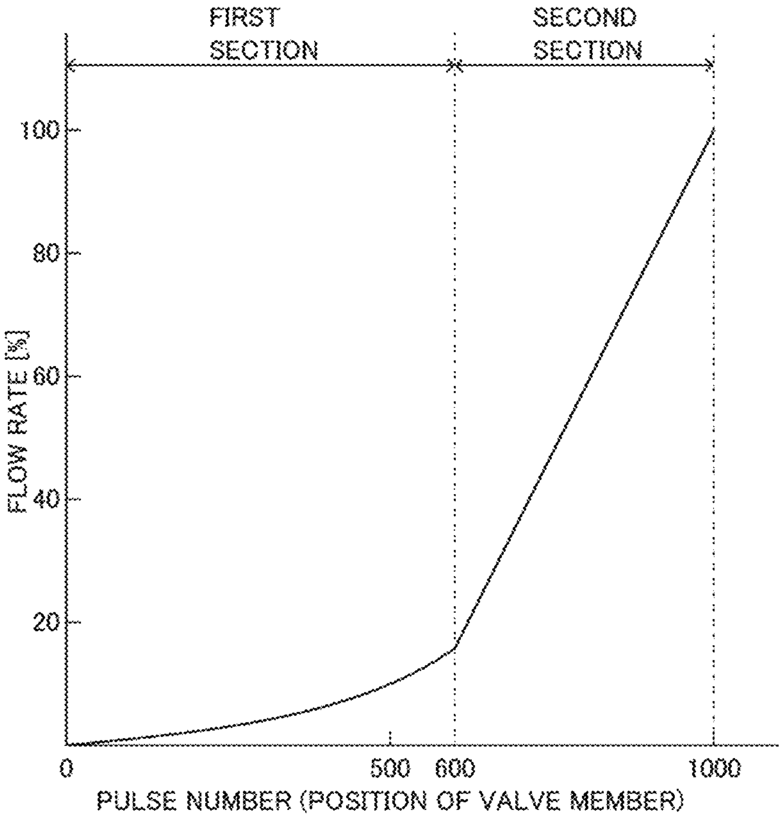
FIG. 11 is a graph showing another example of the relationship between the position of the valve member and the flow rate of fluid flowing through the valve port of the electric valve.
Figure 12:
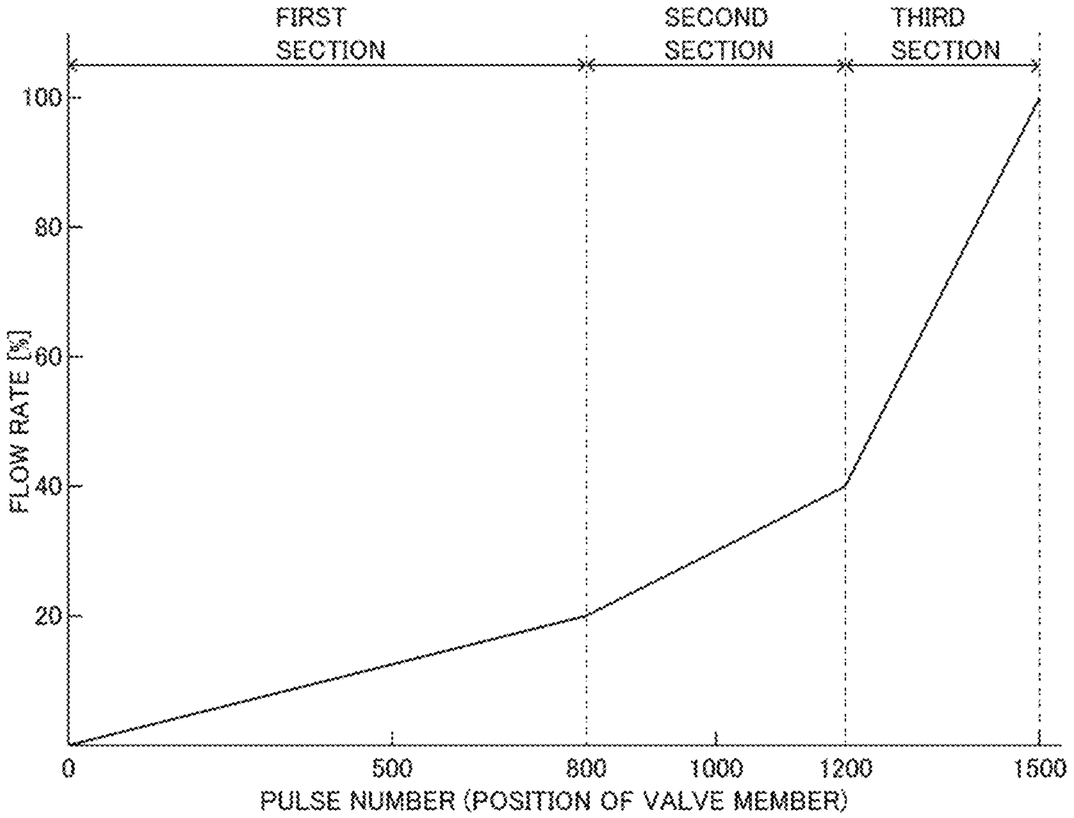
FIG. 12 is a graph showing still another example of the relationship between the position of the valve member and the flow rate of fluid flowing through the valve port of the electric valve.

As a result of the stepping motor 66 (the magnet rotor 31) being rotated on the basis of the table 310, the electric valve 1 operates as an electric valve having the flow-rate characteristics shown in FIG. 10. In the flow-rate characteristic shown in FIG. 10, the step angles in the first section and the second section are constant. Besides this configuration, for example, another configuration in which the step angle set in the first section of the table 310 increases as the pulse number increases may be employed. This enables the electric valve 1 to operate as an electric valve having the flow-rate characteristics shown in FIG. 11. In the flow-rate characteristics shown in FIG. 11, the change amount of the flow rate per pulse is gradually increases as the pulse number increases in the first section. For example, a third section following the second section may be provided in the table 310. The step angle used in the third section is set so as to be greater than that used in the second section and constant. This enables the electric valve 1 to operate as an electric valve having the flow-rate characteristics shown in FIG. 12. In FIG. 12, the position "0" of the valve member 40 serves as the valve closing position Pa, the position "800" of the valve member 40 serves as a first position, the position "1200" of the valve member 40 serves as a second position, and the position "1500" of the valve member 40 serves as a third position and the full-open position Pz. The third position is farther from the valve closing position Pa than the second position. A desired flow-rate characteristic can be obtained in the electric valve 1 by appropriately setting the step angles in the table 310.

The communication unit 220 communicates with the control unit 400 through the communication module. The communication unit 220 receives various commands from the control unit 400 and transfers them to the computing unit 230. The communication unit 220 obtains various states of the electric valve 1 from the computing unit 230 and the rotation control unit 240 and transmits them to the control unit 400. The communication unit 220 receives a valve-member movement command from the control unit 400. The valve-member movement command contains information relating to a target position Pt of the valve member 40. The information indicates a target of the valve opening degree. The information may indicate a relative movement distance (the number of pulses or the like) from a present position Pc of the valve member 40. The computing unit 230 obtains the target position Pt of the valve member 40 on the basis of the information.

The present position Pc of the valve member 40 is stored in the working memory when the electric valve 1 is in operation and is stored in the storage unit 210 when the electric valve 1 is powered off.

In the electric valve 1, the valve opening degrees 0 [%] to 100 [%] that are designated by the control unit 400 correspond to the positions "0" to "1000" of the valve member 40. For example, when the valve opening degree contained in the valve-member movement command is 0%, the target position Pt is the position "0". When the valve opening degree contained in the valve-member movement command is 25%, the target position Pt is the position "250". When the valve opening degree contained in the valve-member movement command is 50%, the target position Pt is the position "500". When the valve opening degree contained in the valve-member movement command is 75%, the target position Pt is the position "750". When the valve opening degree contained in the valve-member movement command is 100%, the target position Pt is the position "1000". When the number indicating the present position Pc of the valve member 40 is smaller than the number indicating the target position Pt of the valve member 40, the rotation direction of the stepping motor 66 is a direction (a valve opening direction) in which the valve member 40 moves away from the valve seat 16. When the number indicating the present position Pc of the valve member 40 is greater than the number indicating the target position Pt of the valve member 40, the rotation direction of the stepping motor 66 is a direction (a valve closing direction) in which the valve member 40 moves toward the valve seat 16.

The computing unit 230 performs various computing operations. When the communication unit 220 receives the valve-member movement command, the computing unit 230 obtains the position of the valve member 40 corresponding to the valve opening degree contained in the valve-member movement command as the target position Pt. For example, when the valve opening degree is 10 [%], the computing unit 230 obtains the position "100" as the target position Pt. When the valve opening degree is 50 [%], the computing unit 230 obtains the position "500" as the target position Pt. When the valve opening degree is 90 [%], the computing unit 230 obtains the position "900" as the target position Pt.

Then, the computing unit 230 obtains the pulse number between the present position Pc (a starting point) of the valve member 40 and the target position Pt (a destination point) of the valve member 40. For example, when the present position Pc is the position "0" and the target position Pt is the position "150", the computing unit 230 obtains the pulse numbers "1" to "150". When the present position Pc is the position "150" and the target position Pt is the position "750", the computing unit 230 obtains the pulse numbers "151" to "750". When the present position Pc is the position "750" and the target position Pt is the position "300", the computing unit 230 obtains the pulse numbers "750" to "301".

In addition, the computing unit 230 obtains the rotation angle and the state (rotating or stopped) of the magnet rotor 31 on the basis of the signal output by the magnetic sensor 110.

The rotation control unit 240 obtains the items of the step-angle information, each of which corresponds to one of the pulse numbers, one by one from the table 310 in the order of the pulse numbers assigned to the intervals between the present position Pc of the valve member 40 and the target position Pt of the valve member 40. Then, the rotation control unit 240 calculates the step angle by using the items of the step-angle information and inputs the pulses, the step angles, and the rotation direction to the motor driver so as to rotate the stepping motor 66.

The rotation control unit 240 determines whether the valve-member movement command has succeeded or failed.

Specifically, the rotation control unit 240 compares the rotation angle (a calculated rotation angle) of the magnet rotor 31 that is obtained by adding up the step angles, each of which corresponds to one of the pulse numbers assigned to the intervals between the present position Pc and the target position Pt, with the rotation angle (a measured rotation angle) of the magnet rotor 31 that is obtained by the computing unit 230 on the basis of the signal of the magnetic sensor 110. When the calculated rotation angle matches the measured rotation angle, the rotation control unit 240 transmits information, which indicates that the valve-member movement command has succeeded, to the control unit 400 through the communication unit 220 as a command result. When the calculated rotation angle does not match the measured rotation angle, the rotation control unit 240 transmits information, which indicates that the valve-member movement command has failed, to the control unit 400 through the communication unit 220 as a command result.

An example of a normal operation of the electric valve 1 is described below.

The controller 80 of the electric valve 1 transitions to a start-up state when the controller 80 is powered on. In the start-up state, the controller 80 copies the present position Pc from the storage unit 210 to the working memory and then transitions to a normal operation state. In the normal operation state, the controller 80 waits for a command transmitted from the control unit 400. The control unit 400 considers that the electric valve 1 has the flow-rate characteristics illustrated in FIG. 10. For example, the present position Pc of the valve member 40 immediately after the electric valve 1 transitions to the normal operation state is set to the valve closing position Pa (the position "0").

For example, upon receiving the valve-member movement command containing the valve opening degree of 90 [%] from the control unit 400, the controller 80 obtains the position "900" as the target position Pt. The controller 80 obtains the pulse numbers "1" to "900" assigned to the intervals between the present position Pc and the target position Pt.

The controller 80 calculates the step angles corresponding to the pulse numbers "1" to "900" on the basis of the table 310. Since the number indicating the present position Pc (the position "0") is smaller than the number indicating the target position Pt (the position "900"), the controller 80 sets the rotation direction to "the valve opening direction". The controller 80 inputs the pulses, the step angles, and the rotation direction to the motor driver so as to rotate the stepping motor 66 (the magnet rotor 31). The valve stem 34 rotates in the valve opening direction together with the magnet rotor 31. The screw-feed action between the internal thread 13*c* of the supporting member 13 and the external thread 34*c* of the valve stem 34 moves the valve stem 34 upward. The valve member 40 moves upward together with the valve stem 34, and the valve member 40 moves away from the valve seat 16. The controller 80 adds up the step angles corresponding to the pulse numbers "1" to "900" to obtain the rotation angle (the calculated rotation angle) of the magnet rotor 31. The controller 80 obtains the rotation angle (the measured rotation angle) of the magnet rotor 31 on the basis of the signal of the magnetic sensor 110.

When the rotation of the stepping motor 66 at the step angles corresponding to the pulse numbers "1" to "900" is complete, the controller 80 stores the position "900" into the working memory as the present position Pc. The controller 80 determines whether the valve-member movement command has succeeded or failed. Specifically, the controller 80 compares the calculated rotation angle with the measured rotation angle. When the calculated rotation angle matches the measured rotation angle, the controller 80 transmits the information, which indicates that the valve-member movement command has succeeded, to the control unit 400 as the command result. When the calculated rotation angle does not match the measured rotation angle, the controller 80 transmits the information, which indicates that the valve-member movement command has failed, to the control unit 400 as the command result. Then, the controller 80 waits for the following command transmitted from the control unit 400.

Next, for example, upon receiving the valve-member movement command containing the valve opening degree of 50 [%] from the control unit 400, the controller 80 obtains the position "500" as the target position Pt. The controller 80 obtains the pulse numbers "900" to "501" assigned to the intervals between the present position Pc and the target position Pt.

The controller 80 calculates the step angles corresponding to the pulse numbers "900" to "501" on the basis of the table 310. Since the number indicating the present position Pc (the position "900") is greater than the number indicating the target position Pt (the position "500"), the controller 80 sets the rotation direction to "the valve closing direction". The controller 80 inputs the pulses, the step angles, and the rotation direction to the motor driver so as to rotate the stepping motor 66 (the magnet rotor 31). The valve stem 34 rotates in the valve closing direction together with the magnet rotor 31. The screw-feed action between the internal thread 13*c* of the supporting member 13 and the external thread 34*c* of the valve stem 34 moves the valve stem 34 downward. The valve member 40 moves downward together with the valve stem 34, and the valve member 40 moves toward the valve seat 16. The controller 80 adds up the step angles corresponding to the pulse numbers "900" to "501" to obtain the rotation angle (the calculated rotation angle) of the magnet rotor 31. The controller 80 obtains the rotation angle (the measured rotation angle) of the magnet rotor 31 on the basis of the signal of the magnetic sensor 110.

When the rotation of the stepping motor 66 at the step angles corresponding to the pulse numbers "900" to "501" is complete, the controller 80 stores the position "501" into the working memory as the present position Pc. The controller 80 determines whether the valve-member movement command has succeeded or failed and transmits its command result to the control unit 400. Then, the controller 80 waits for the following command transmitted from the control unit 400. After that, the controller 80 performs operations according to receiving commands. Upon receiving a power-off command from the control unit 400, the controller 80 copies the present position Pc from the working memory to the storage unit 210 and prepares for power-off.

An example of a method for obtaining a valve-member position of the electric valve 1 is described below. Before shipment of the electric valve 1 from the factory, the table 310 and the present position Pc of the valve member 40 are stored in the storage unit 210.

Figure 13:
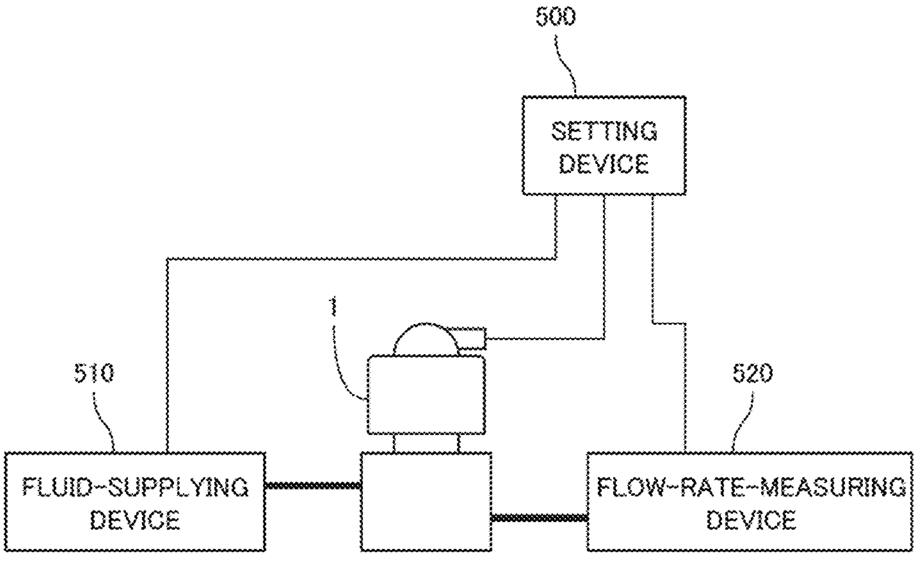
FIG. 13 is a diagram illustrating an example of a system for setting the electric valve before shipment from the factory.

FIG. 13 illustrates an example of a system for setting the electric valve before shipment from the factory. The controller 80 of the electric valve 1 is connected to a setting device 500 via a cable attached to the connector 73. For example, a desktop computer serves as the setting device 500. The setting device 500 can control the stepping motor 66 via the controller 80. The setting device 500 can store various information in the storage unit 210 of the controller 80. The setting device 500 can rotate the stepping motor 66 at a constant step angle in the moving section between the valve closing position Pa and the full-open position Pz. In the embodiment, the setting device 500 controls the stepping motor 66 to perform the full-step operation (the step angle: 7.5 degrees). The valve opening degrees 0 [%] to 100 [%] that are designated by the setting device 500 correspond to the positions "0" to "500" of the valve member 40. When 500 pulses are input to the stepping motor 66, the valve member 40 moves from the valve closing position Pa (the position "0") to the full-open position Pz (the position "500"). A storage device of the setting device 500 stores a flow rate F0, which is in design, of fluid flowing through the valve port 15 when the valve member 40 is at the valve closing position Pa.

A fluid-supplying device 510 is connected to the flow channel 17 of the electric valve 1, and a flow-rate-measuring device 520 is connected to the flow channel 18 of the electric valve 1. The fluid-supplying device 510 can supply fluid at a constant flow rate. The flow-rate-measuring device 520 measures the flow rate of fluid flowing out of the flow channel 18. The fluid-supplying device 510 and the flow-rate-measuring device 520 are controlled by the setting device 500.

The setting device 500 controls the fluid-supplying device 510 to start supplying fluid to the electric valve 1.

The setting device 500 considers a position where the valve member 40 of the electric valve 1 is at present as a position P1 and obtains a flow rate measured by the flow-rate-measuring device 520 as a flow rate F1 of fluid at the position P1. The setting device 500 stores a combination C1 of the position P1 and the flow rate F1 in the storage device. The setting device 500 may estimate the position P1 on the basis of the flow rate F1.

The setting device 500 inputs pulses to the stepping motor 66 to rotate it, moving the valve member 40 to a position P2, which is different from the position P1. The setting device 500 obtains a flow rate measured by the flow-rate-measuring device 520 as a flow rate F2 of fluid at the position P2. The setting device 500 stores a combination C2 of the position P2 and the flow rate F2 in the storage device.

The setting device 500 calculates a change (a slope A) in flow rate per pulse on the basis of the combinations C1 and C2. Specifically, the slope A is calculated by using the following expression (1). P1 is the number indicating the position P1, P2 is the number indicating the position P2, F1 is the flow rate of fluid when the valve member 40 is at the position P1, and F2 is the flow rate of fluid when the valve member 40 is at the position P2.

$$A = |F2 - F1|/|P2 - P1| \tag{1}$$

The setting device may calculate the slope A on the basis of three or more of the combinations (C1, C2, . . . , Cn).

The setting device 500 sets the flow rate F0 as an intercept B and determines a linear function expression representing a relationship between the position of the valve member 40 and the flow rate of fluid flowing through the valve port 15. Where X represents the position and Y represents the flow rate, the linear function expression is expressed by the following expression (2)

$$Y = AX + B. \tag{2}$$

The setting device 500 substitutes the flow rate measured by the flow-rate-measuring device 520 for Y in the expression (2) to calculate the position X and sets the position X as the present position Pc of the valve member 40.

The setting device 500 rotates the stepping motor 66 to move the valve member 40 from the present position Pc to the valve closing position Pa.

Then, the setting device 500 stores the table 310 in the storage unit 210 and also stores the position "0" as the present position Pc in the storage unit 210.

For example, when the combination C1 contains the position "100" and flow rate "40%", the combination C2 contains the position "200" and the flow rate "60%", and the flow rate F0 is flow rate "0%", the setting device 500 obtains the following expression (2A) in which the slope A is 0.2 and the intercept B is 0.

expression (2A)

$$Y = 0.2X \tag{2A}$$

When the flow rate at the position where the valve member 40 of the electric valve 1 is at present is "60%" for example, the setting device 500 obtains the position "300" by using the expression (2A) as the present position Pc of the valve member 40. The setting device 500 inputs 300 pulses to the stepping motor 66 to rotate it, moving the valve member 40 from the position "300" to the position "0". The setting device 500 stores the table 310 in the storage unit 210 and also stores the position "0" in the storage unit 210 as the present position Pc.

The electric valve 1 includes the valve body 10 that has the valve port 15 and the valve seat 16 enclosing the valve port 15, the valve member 40 that faces the valve port 15, the stepping motor 66 for moving the valve member 40, and the controller 80 that controls the stepping motor 66. The valve member 40 includes the control portion 45 that has the single tapered shape. The stepping motor 66 rotates to move the valve member 40 in the moving section between the valve closing position Pa and the full-open position Pz. When the valve member 40 is at the valve closing position Pa, the control surface 46 of the control portion 45 is in contact with the valve seat 16. When the valve member 40 moves from the valve closing position Pa and is in the moving section, the throttle passage is formed between the valve seat 16 and the control surface 46. The moving section includes the first section between the valve closing position Pa and the first position (the position "600") and the second section between the first position and the second position (the full-open position Pz). The second position is farther from the valve closing position Pa than the first position. The controller 80 sets the step angle for the stepping motor 66 when the valve member 40 is in the first section and the step angle when the valve member 40 is in the second section, and the step angles are different from each other.

According to this configuration, when the valve member 40 is at the valve closing position Pa, the control surface 46 of the control portion 45 having the single tapered shape is in contact with the valve seat 16. When the valve member 40 moves from the valve closing position Pa and is in the moving section, the throttle passage is formed between the valve seat 16 and the control surface 46. Therefore, the variation in the area of the throttle passage can be inhibited. Additionally, the controller 80 sets the step angle for the stepping motor 66 when the valve member 40 is in the first section and the step angle when the valve member 40 is in the second section, and the step angles are different from each other. Therefore, a desired flow-rate characteristic can be obtained by appropriately setting the step angles in the first and second sections.

The step angle when the valve member 40 is in the first section is smaller than the step angle when the valve member 40 is in the second section. With this configuration, the flow rate can be finely controlled when the electric valve 1 is in a micro flow-rate state in which the area of the throttle passage is relatively small.

The step angle when the valve member 40 is in the first section may be greater than the step angle when the valve member 40 is in the second section.

The stepping motor 66 includes the magnet rotor 31, the A-phase stator 61, and the B-phase stator 62. When the valve member 40 is in the first section, the controller 80 controls the stepping motor 66 to perform the micro-step operation. When the valve member 40 is in the second section, the controller 80 controls the stepping motor 66 to perform the full-step operation. With this configuration, the step angle when the valve member 40 is in the first section can be smaller than the step angle when the valve member 40 is in the second section in a relatively simple control manner.

Alternatively, when the valve member 40 is in the first section, the controller 80 may set the excitation mode of the stepping motor 66 to 1-2-phase excitation, and when the valve member 40 is in the second section, the controller 80 may set the excitation mode of the stepping motor 66 to 2-phase excitation.

The method for obtaining the valve-member position of the electric valve 1 includes (1) the step for obtaining two or more combinations of the position of the valve member 40 and the flow rate of fluid flowing through the valve port 15 when the valve member 40 is at the position, (2) the step for determining the linear function expression representing the relationship between the position and the flow rate based on the flow rate F0 in design when the valve member 40 is at the valve closing position Pa and the combinations, and (3) the step for obtaining the present position Pc of the valve member 40 by using the linear function expression. With this configuration, the present position Pc and the valve closing position Pa of the valve member 40 can be obtained on the basis of the measured flow rate. Therefore, the electric valve 1 can have a configuration in which a stopper mechanism physically restricting the rotation of the magnet rotor 31 at the valve closing position Pa is omitted. The method for obtaining the valve-member position can be applied to an electric valve in which the control surface 46 is not in contact with the valve seat 16 when the valve member 40 is at the valve closing position Pa.

In the electric valve 1, when the valve member 40 is at the valve closing position Pa, the control surface 46 is in contact with the inner peripheral edge 16*a* of the valve seat 16, restricting the valve member 40 from moving downward. In other words, the valve closing position Pa coincides with a position where the downward movement of the valve member 40 is restricted. Before shipment of the electric valve 1 from the factory, the linear function expression determined in the step (2) above may be stored in the storage unit 210 of the controller 80. The electric valve 1 is installed in the refrigeration cycle system. When the controller 80 receives the valve-member movement command (for example, including a target flow rate) from the control unit 400, the controller 80 can control the stepping motor 66 to move the valve member 40 by using the present flow rate, the target flow rate, and the linear function expression. The flow rate of fluid flowing through the electric valve 1 corresponds to the position of the valve member 40. That is, the flow rates 0% to 100% of the electric valve 1 correspond to the positions "0" to "500".

In the electric valve 1, since the valve stem 34 is secured to the magnet rotor 31, the rotation of the magnet rotor 31 in the valve closing direction is restricted at the same time the downward movement of the valve member 40 is restricted. In addition to this configuration, a configuration can be used where the rotation of a magnet rotor 31 in a valve closing direction is restricted by a stopper mechanism 41 after the downward movement of a valve member 40 is restricted, such as an electric valve 1A illustrated in FIG. 14.

Figure 14:
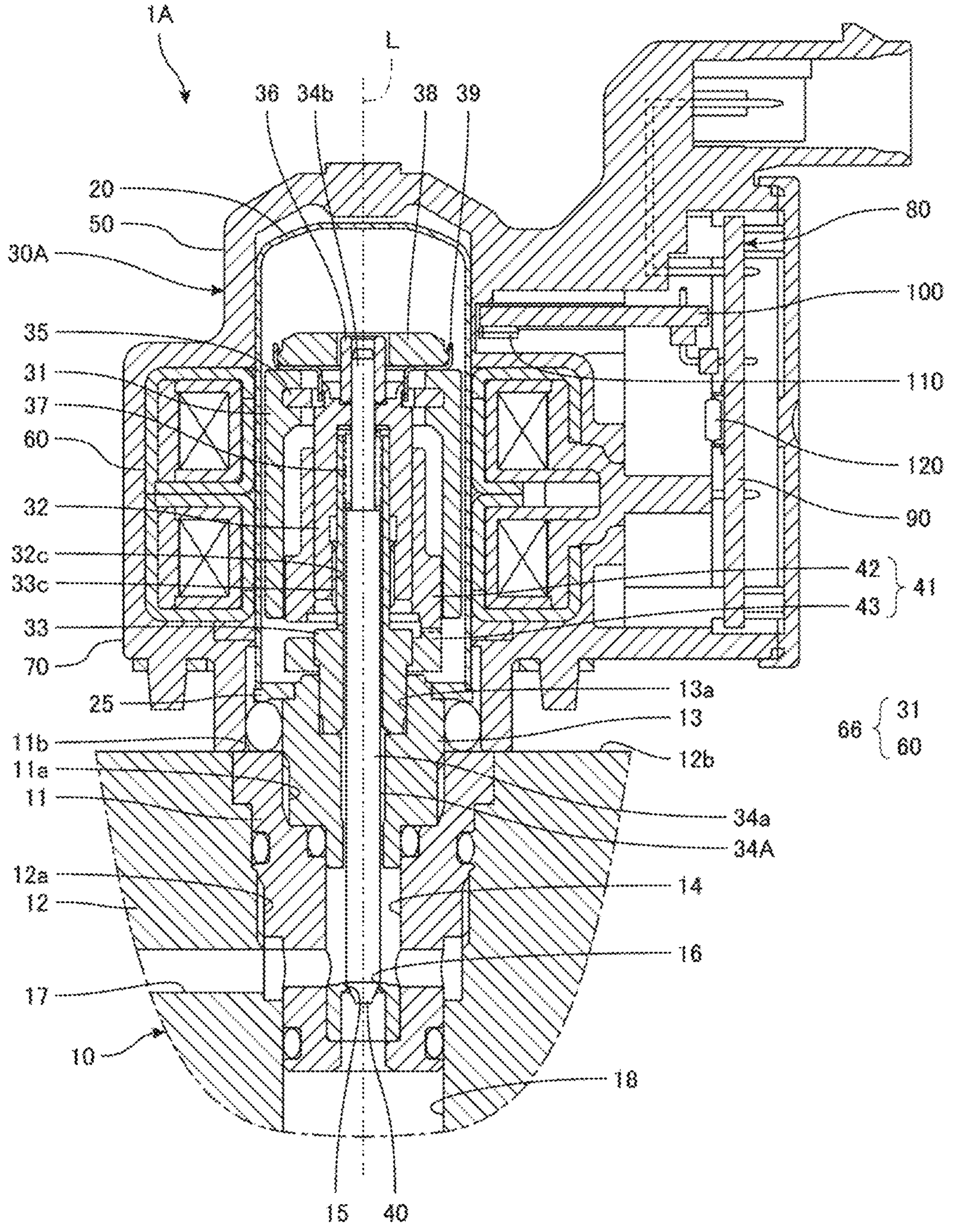
FIG. 14 is a sectional view illustrating a configuration of a modification of the electric valve in FIG. 1.
Figure 15:
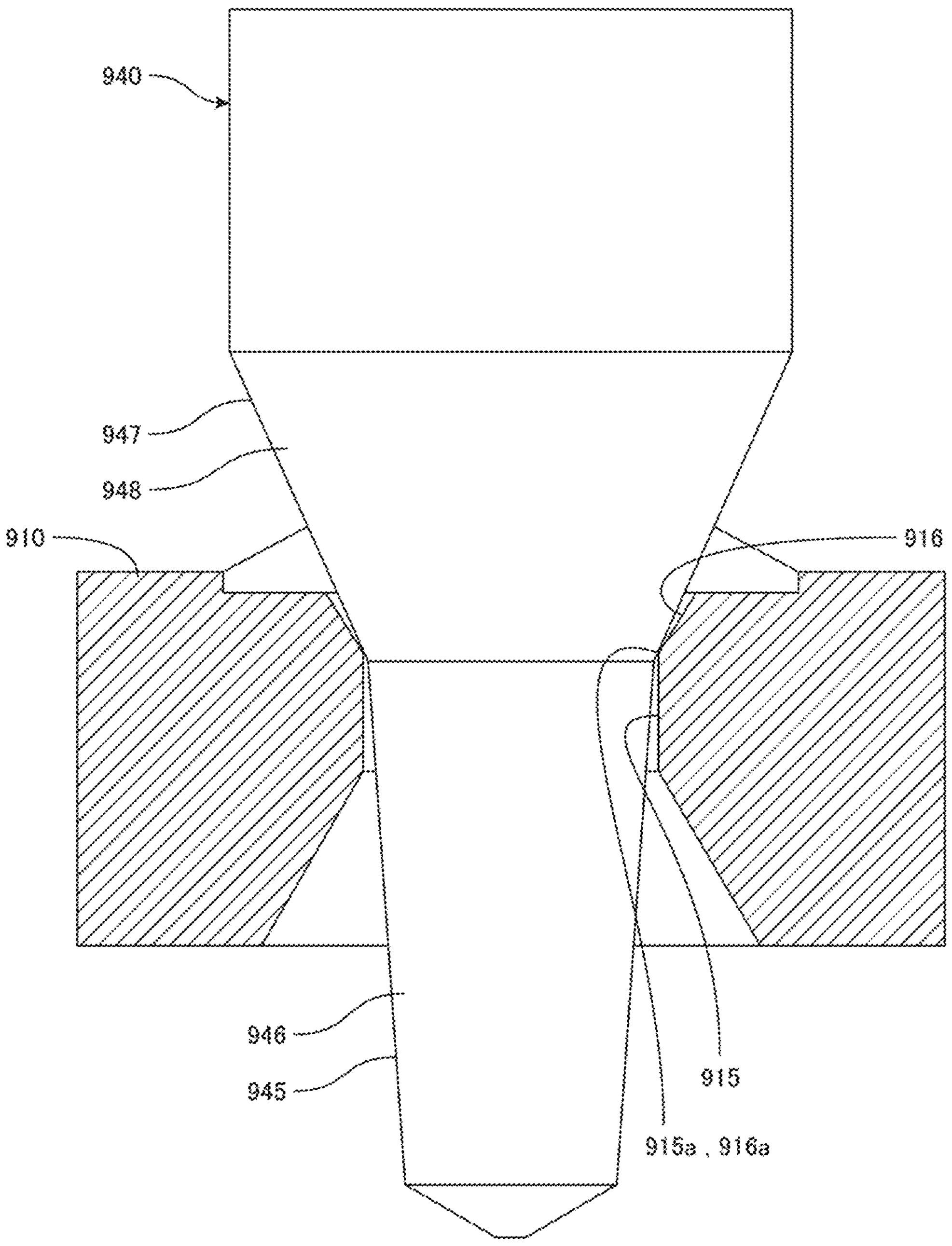
FIG. 15 is a sectional view of a valve member and members in its vicinity of an electric valve according to the related art.
Figure 16:
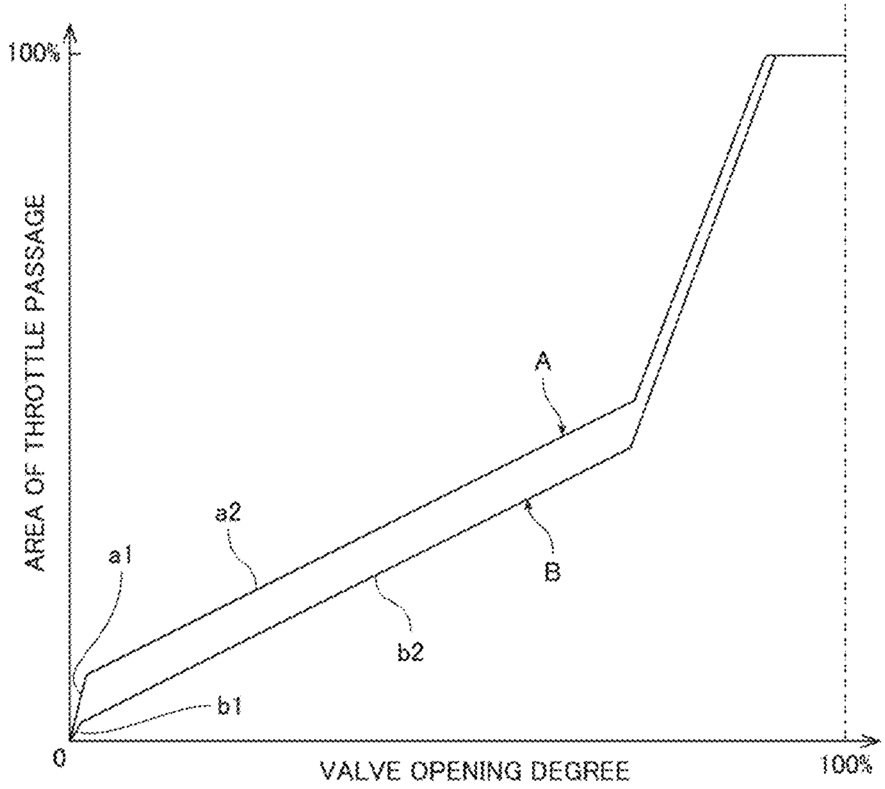
FIG. 16 is a graph showing a relationship between a valve opening degree and an area of a throttle passage of the electric valve according to the related art.

As illustrated in FIG. 14, the electric valve 1A includes a valve body 10, a can 20, a driving mechanism 30A, the valve member 40, and a controller 80. In the description of the electric valve 1A, elements having the same (including substantially the same) configurations as those of the electric valve 1 are denoted by the same reference signs as those of the electric valve 1, and detailed descriptions of these elements are omitted.

The driving mechanism 30A moves the valve member 40 in an up-and-down direction. The driving mechanism 30A includes the magnet rotor 31, a valve stem holder 32, a guide bush 33, a valve stem 34A, a permanent magnet 38, the stopper mechanism 41, and a stator unit 50.

The valve stem holder 32 has a circular cylindrical shape. The valve stem holder 32 is open at the lower end and is closed at the upper end. A supporting ring 35 is secured to the upper end of the valve stem holder 32. The supporting ring 35 couples the magnet rotor 31 to the valve stem holder 32. The valve stem holder 32 has an internal thread 32*c*. The internal thread 32*c* is disposed on the inner circumferential surface of the valve stem holder 32.

The guide bush 33 has a circular cylindrical shape. The outer diameter of the upper part of the guide bush 33 is smaller than that of the lower part of the guide bush 33. The lower part of the guide bush 33 is press-fitted to a fitting hole 13*a* provided in a supporting member 13. The guide bush 33 has an external thread 33*c*. The external thread 33*c* is disposed on the outer circumferential surface of the upper part of the guide bush 33. The external thread 33*c* is screwed into the internal thread 32*c* of the valve stem holder 32. The guide bush 33 is joined to the supporting member 13. In the electric valve 1A, the supporting member 13 does not have an internal thread 13*c*.

The valve stem 34A includes a large-diameter portion 34*a* and a small-diameter portion 34*b*. The large-diameter portion 34*a* and the small-diameter portion 34*b* each have a circular columnar shape. The outer diameter of the large-diameter portion 34*a* is slightly smaller than the inner diameter of the guide bush 33. The outer diameter of the small-diameter portion 34*b* is smaller than that of the large-diameter portion 34*a*. The small-diameter portion 34*b* is coaxially connected to the upper end of the large-diameter portion 34*a*. The small-diameter portion 34*b* extends through the valve stem holder 32. A push nut 36 as a retainer is attached to the small-diameter portion 34*b*. The valve stem 34A is disposed inside the guide bush 33 and the supporting member 13. The guide bush 33 supports the valve stem 34A movably in the up-and-down direction. The lower end of the valve stem 34A is disposed in a valve chamber 14. The valve stem 34A has a step portion. The step portion is disposed in the connecting point of the large-diameter portion 34*a* and the small-diameter portion 34*b*. The step portion is an annular plane facing upward. A valve closing spring 37 is disposed between the valve stem holder 32 and the step portion. The valve closing spring 37 is a compression coil spring. The valve closing spring 37 pushes the valve stem 34A downward.

The permanent magnet 38 is disposed above the magnet rotor 31 inside the can 20. The permanent magnet 38 has a circular annular flat plate-like shape. The permanent magnet 38 has a north (N) pole and a south(S) pole. The permanent magnet 38 includes two parts divided by its diameter, with the N pole disposed in one of the two parts, and the S pole disposed in the other. The permanent magnet 38 is secured to the supporting ring 35 via a fixing member 39. The permanent magnet 38 rotates together with the magnet rotor 31.

In the electric valve 1A, a magnetic sensor 110 serves as a rotation angle sensor. The magnetic sensor 110 laterally faces the permanent magnet 38 with the can 20 and a partition wall 76 in between. The magnetic sensor 110 outputs a signal corresponding to the direction of the magnetic field generated by the permanent magnet 38 (i.e., a rotation angle of the magnet rotor 31 rotating together with the permanent magnet 38).

The stopper mechanism 41 includes a movable stopper 42 and a fixed stopper 43. The movable stopper 42 is secured to the valve stem holder 32. The movable stopper 42 rotates together with the valve stem holder 32. The fixed stopper 43 is secured to the lower part of the guide bush 33. When the movable stopper 42 comes into contact with the fixed stopper 43, the rotation of the valve stem holder 32 (i.e., the magnet rotor 31) in the valve closing direction is restricted.

The internal thread 32*c* of the valve stem holder 32 and the external thread 33*c* of the guide bush 33 constitute a screw-feed mechanism. When the magnet rotor 31 rotates in a valve opening direction, a screw-feed action between the internal thread 32*c* and the external thread 33*c* moves the valve stem holder 32 upward, and the valve stem holder 32 pushes the push nut 36 upward. This causes the valve stem 34A and the valve member 40 to move upward. When the magnet rotor 31 rotates in the valve closing direction, the screw-feed action between the internal thread 32*c* and the external thread 33*c* moves the valve stem holder 32 downward, and the valve stem holder 32 pushes the valve stem 34A downward via the valve closing spring 37. This causes the valve stem 34A and the valve member 40 to move downward. When the valve member 40 moves downward and a control surface 46 comes into contact with an inner peripheral edge 16*a* of a valve seat 16, the downward movement of the valve member 40 is restricted. When the magnet rotor 31 further rotates in the valve closing direction, the valve closing spring 37 is compressed, the movable stopper 42 comes into contact with the fixed stopper, and the rotation of the magnet rotor 31 in the valve closing direction is restricted.

Before shipment of the electric valve 1A from the factory, a storage unit 210 of the controller 80 may store

[i] the linear function expression determined in the step (2) above;

[ii] a valve closing position Pa calculated by using the linear function expression; and

[iii] a virtual position (a reference position Px) of the valve member 40 when the movable stopper 42 comes into contact with the fixed stopper 43.

In reality, the downward movement of the valve member 40 is restricted when the valve member 40 comes into contact with the valve seat 16, and "the virtual position of the valve member 40" is a position where the valve member 40 would reach if the movement of the valve member 40 is not restricted and the valve member 40 moves downward. In the electric valve 1A, when the number indicating the valve closing position Pa is "0", the number indicating the reference position Px is a negative value, and the flow rate when the valve member 40 is at the reference position Px is also a negative value. The reference position Px and the flow rate when the valve member 40 is at the reference position Px satisfy the linear function expression. For example, the flow rate is −20%. The electric valve 1A is installed in the refrigeration cycle system. When the controller 80 receives the valve-member movement command (for example, including a target flow rate) from the control unit 400, the controller 80 can control the stepping motor 66 by using the present flow rate, the target flow rate, and the linear function expression. The flow rate of fluid flowing through the electric valve 1A corresponds to the position of the valve member 40. That is, the flow rates 0% to 100% of the electric valve 1A correspond to the positions "0" to "500". The flow rates −20% to 0% of the electric valve 1A correspond to the positions "−100" to "0".

For example, in the electric valve 1A, when the present position Pc is the position "50" (the flow rate 10%) and the controller 80 receives the valve-member movement command containing the flow rate 30%, the controller 80 calculates the position (the target position Pt, the position "150") of the valve member 40 corresponding to the flow rate 30% by using the linear function expression. Then, the controller 80 inputs the differential number of pulses between the number (150) indicating the target position Pt and the number (50) indicating the present position Pc to the stepping motor 66.

For example, in the electric valve 1A, when the present position Pc is the reference position Px (the position "−100", the flow rate −20%) and the controller 80 receives the valve-member movement command containing the flow rate 30%, the controller 80 calculates the position (the target position Pt, the position "150") of the valve member 40 corresponding to the flow rate 30% by using the linear function expression. Then, the controller 80 inputs the differential number of pulses between the number (150) indicating the target position Pt and the number (−100) indicating the present position Pc to the stepping motor 66.

In the electric valve 1A, the number of pulses (a valve opening pulse number) corresponding to the distance from the reference position Px to the valve closing position Pa may be stored in the storage unit 210 in advance. The electric valve 1A may calculate the position of the valve member 40 in a moving section between the valve closing position Pa and a full-open position Pz by using the linear function expression and in a section between the reference position Px and the valve closing position Pa by using the valve opening pulse number.

Although the electric valve 1 is a direct-driving electric valve that includes the driving mechanism 30 using the rotation of the magnet rotor 31 without speed being reduced, the present invention is also applicable to an electric valve that includes a driving mechanism having a mechanism for reducing rotation speed of a magnet rotor.

In this specification, the terms indicating shapes, such as "circular cylindrical" and "circular columnar", are also used for members and portions of the members substantially having the shapes indicated by the terms. For example, "circular cylindrical member" includes a circular cylindrical member and a substantially circular cylindrical member.

The embodiments of the present invention are described above. The present invention, however, is not limited to these embodiments. Embodiments obtained by a person skilled in the art appropriately adding, removing, or modifying components according to the embodiments described above, and an embodiment obtained by appropriately combining features of the embodiments are included in the scope of the present invention without departing from the spirit of the present invention.

REFERENCE SIGNS LIST

1, 1A . . . electric valve, 10 . . . valve body, 11 . . . body member, 11*a* . . . first mounting hole, 11*b* . . . upper surface, 12 . . . flow channel block, 12*a* . . . second mounting hole, 12*b* . . . upper surface, 13 . . . supporting member, 13*a* . . . fitting hole, 13*c* . . . internal thread, 14 . . . valve chamber, 15 . . . valve port, 15*a* . . . upper end, 16 . . . valve seat, 16*a* . . . inner peripheral edge, 17 . . . flow channel, 18 . . . flow channel, 20 . . . can, 25 . . . connecting member, 30, 30A . . . driving mechanism, 31 . . . magnet rotor, 32 . . . valve stem holder, 32*c* . . . internal thread, 33 . . . guide bush, 33*c* . . . external thread, 34, 34A . . . valve stem, 34*a* . . . large-diameter portion, 34*b* small-diameter portion, 34*c* . . . external thread, 35 . . . supporting ring, 36 . . . push nut, 37 . . . valve closing spring, 38 . . . permanent magnet, 39 . . . fixing member, 40 . . . valve member, 41 . . . stopper mechanism, 42 . . . movable stopper, 43 . . . fixed stopper, 45 . . . control portion, 45*a* . . . lower end, 46 . . . control surface, 50 . . . stator unit, 60 . . . stator, 60*a* . . . stator inner-circumferential surface, 61 . . . . A-phase stator, 61*a* . . . pole tooth, 61*b* . . . pole tooth, 61*c* . . . coil, 62 . . . . B-phase stator, 62*a* . . . pole tooth, 62*b* . . . pole tooth, 62*c* . . . coil, 63 . . . molded element, 64 . . . terminal supporting portion, 65 . . . terminal, 66 . . . stepping motor, 70 . . . housing, 70*a* . . . opening, 71 . . . peripheral wall portion, 71*a* . . . inner circumferential surface, 72 . . . upper wall portion, 72*a* . . . inner surface, 73 . . . connector, 74 . . . inner space, 75 . . . circuit board space, 76 . . . partition wall, 77 . . . lid member, 80 . . . controller, 90 . . . main circuit board, 100 . . . sub circuit board, 100*a* . . . first end, 100*b* . . . second end, 110 . . . magnetic sensor, 120 . . . microcomputer, 210 . . . storage unit, 220 . . . communication unit, 230 . . . computing unit, 240 . . . rotation control unit, 310 . . . table, 311 . . . section information area, 312 . . . pulse-number information area, 313 . . . step-angle information area, 400 . . . control unit, 500 . . . setting device, 510 . . . fluid-supplying device, 520 . . . flow-rate-measuring device, L . . . axis, Pa . . . valve closing position, Pz . . . full-open position

The invention claimed is:

1. An electric valve comprising: a valve body that has a valve port and a valve seat enclosing the valve port; a valve member that faces the valve port; a stepping motor for moving the valve member; and a controller that controls the stepping motor, wherein the valve member includes a control portion that has a single tapered shape, wherein the stepping motor rotates to move the valve member in a moving section between a valve closing position and a full-open position, wherein when the valve member is at the valve closing position, an outer circumferential surface of the control portion is in contact with the valve seat, wherein when the valve member moves from the valve closing position and is in the moving section, a throttle passage is formed between the valve seat and the outer circumferential surface, wherein the moving section includes a first section between the valve closing position and a first position and a second section between the first position and a second position farther from the valve closing position than the first position, wherein the controller sets a step angle for the stepping motor when the valve member is in the first section and another step angle when the valve member is in the second section, and the step angles are different from each other, wherein the step angle when the valve member is in the first section is smaller than the step angle when the valve member is in the second section, wherein the stepping motor includes a magnet rotor, an A-phase stator, and a B-phase stator, wherein when the valve member is in the first section, the controller sets an excitation mode of the stepping motor to 1-2-phase excitation, and wherein when the valve member is in the second section, the controller sets the excitation mode of the stepping motor to 2-phase excitation.

2. A method for obtaining a valve-member position of an electric valve including a valve body that has a valve port and a valve seat enclosing the valve port, a valve member that faces the valve port, a stepping motor for moving the valve member, and a controller that controls the stepping motor, the valve member including a control portion that has a single tapered shape, the stepping motor rotating to move the valve member in a moving section between a valve closing position and a full-open position, a throttle passage being formed between the valve seat and an outer circumferential surface of the control portion when the valve member moves from the valve closing position and is in the moving section, the method comprising:

a step for obtaining two or more combinations of a position of the valve member and a flow rate of fluid flowing through the valve port when the valve member is at the position by a setting device connected to the controller;

a step for determining a linear function expression representing a relationship between the position and the flow rate based on a flow rate in design when the valve member is at the valve closing position and the combinations by the setting device; and a step for obtaining a present position of the valve member by using the linear function expression by the setting device.

3. The method for obtaining the valve-member position of the electric valve according to claim 2, the method further comprising: a step for moving the valve member from the present position to the valve closing position and storing an information indicating the valve closing position as the present position in the controller by the setting device.

* * * * *